United States Patent [19]
Morrison et al.

[11] Patent Number: 5,468,498
[45] Date of Patent: Nov. 21, 1995

[54] SULFOPOLYMER/VANADIUM OXIDE ANTISTATIC COMPOSITIONS

[75] Inventors: Eric D. Morrison, West St. Paul; David R. Boston, Woodbury; Steven T. Hedrick; William L. Kausch, both of Cottage Grove; Wayne K. Larson, Maplewood, all of Minn.

[73] Assignee: Minnesota Mining and Manufacturing Company, St. Paul, Minn.

[21] Appl. No.: 406,548

[22] Filed: Mar. 20, 1995

Related U.S. Application Data

[62] Division of Ser. No. 893,279, Jun. 4, 1992, Pat. No. 5,427,835.

[51] Int. Cl.$^6$ .............................. C08K 3/22; C08K 3/10; C08L 81/08
[52] U.S. Cl. ........................ 524/408; 524/431; 524/609; 524/910; 524/911; 524/912
[58] Field of Search ................................. 524/408, 431, 524/609, 910, 911, 912

[56] References Cited

U.S. PATENT DOCUMENTS

| | | | |
|---|---|---|---|
| 3,146,882 | 9/1964 | Wallner et al. | 206/59 |
| 3,624,034 | 11/1971 | Price et al. | 260/49 |
| 3,734,874 | 5/1972 | Kibler et al. | 260/29.2 E |
| 3,779,993 | 12/1973 | Kibler et al. | 260/75 S |
| 3,821,281 | 6/1974 | Radlmann et al. | 260/470 |
| 3,833,457 | 9/1974 | Misumi et al. | 161/170 |
| 3,998,870 | 12/1976 | Carlson | 260/470 |
| 4,052,368 | 10/1977 | Larson | 260/75 S |
| 4,104,262 | 8/1978 | Schade | 528/295 |
| 4,145,327 | 3/1979 | Dolch et al. | 260/29.6 |
| 4,203,769 | 5/1980 | Guestaux | 430/631 |
| 4,304,901 | 12/1981 | O'Neill et al. | 528/290 |
| 4,307,219 | 12/1981 | Larson | 528/71 |
| 4,330,588 | 5/1982 | Larson et al. | 428/264 |
| 4,408,008 | 10/1983 | Markusch | 524/591 |
| 4,478,907 | 10/1984 | Van Gossum | 428/327 |
| 4,503,198 | 3/1985 | Miyai et al. | 525/440 |
| 4,558,149 | 12/1985 | Larson | 560/14 |
| 4,585,730 | 4/1986 | Cho | 430/527 |
| 4,638,017 | 1/1987 | Larson et al. | 521/157 |
| 4,738,992 | 4/1988 | Larson et al. | 521/157 |
| 4,746,717 | 5/1988 | Larson | 528/68 |
| 4,855,384 | 8/1989 | Larson | 528/60 |
| 4,908,155 | 3/1990 | Leemans et al. | 252/353 |
| 4,978,740 | 12/1990 | Kawamoto et al. | 528/272 |
| 5,006,451 | 4/1991 | Anderson et al. | 430/527 |
| 5,098,785 | 3/1992 | Yanagita | 428/332 |
| 5,203,884 | 4/1993 | Buchanan | 51/295 |
| 5,322,761 | 6/1994 | Kausch et al. | 430/273 |
| 5,407,603 | 4/1995 | Morrison | 252/518 |

FOREIGN PATENT DOCUMENTS

| | | |
|---|---|---|
| 352882 | 6/1988 | European Pat. Off. . |
| 0422919 | 4/1991 | European Pat. Off. . |
| 0435080 | 7/1991 | European Pat. Off. . |
| 1294306 | 5/1988 | Japan . |
| 05119433 | 5/1993 | Japan . |
| 2032405 | 5/1980 | United Kingdom . |

OTHER PUBLICATIONS

"Electric Moments of the Simple Alkyl Orthovanadates," Cartan et al., *J. Phys. Chem.*, 64, (1960), pp. 1756–1768.
"Mixed Valence Polyvanadic Acid Gels," Gharbi et al., *Inorg. Chem.*, 21, (1982), pp. 2758–2565.
"Synthesis of Amorphous Vanadium Oxide from Metal Alkoxide," Hioki et al., *Nippon Seramikkusu Kyokai Gakujutsu Ronbunshi*, 97, (6), (1989), pp. 628–633.
"Synthesis of $V_2O_5$ Gels from Vanadyl Alkoxides," Hirashima et al., *Nippon Seramikkusu Kyokai Gakujutsu Ronbunshi*, 97, (1989), (3), pp. 235–238.
"Vanadium Pentoxide Gels," Livage, *Chem. Mater.*, 3, (1991), pp. 578–593.
"Sol–Gel Synthesis of Vanadium Oxide from Alkoxides," Nabavi et al., *Eur. J. Solid State Inorg. Chem.*, 28, (1991), pp. 1173–1192.
Abstract for "Colloidal Vanadium Pentoxide," Ostermann, *Wiss. U. Ind.*, (1922), pp. 17–19.
Abstract for "Vanadic Acid Esters and Some Other Organic Vanadium Compounds," Prandtl et al., *Z. Anorg. Chem.*, 82, pp. 103–129.
"Synthesis and Characterization of Vanadium Oxide Gels from Alkoxy–Vanadate Precursors," Sanchez et al., *Mat. Res. Soc., Symp. Proc.*, 121, (1988), pp. 93–104.
"The Preparation of Colloidal Vanadic Acid," Wegelin, *Z. Chem. Ind. Kolloide*, 2, (1912), pp. 25–28; and English abstract therefor.
"Preparation of Colloidal Vanadic Acid by a New Dispersion Method," Muller, *Z. Chem. Ind. Kolloide*, 8, (1911), pp. 302–303; and English abstract therefor.
Japanese Kokai SHO 54 [1979]–152197.

*Primary Examiner*—Peter A. Szekely
*Attorney, Agent, or Firm*—Gary L. Griswold; Walter N. Kirn; Lorraine R. Sherman

[57] ABSTRACT

Aqueous-based mixtures comprising colloidal vanadium oxide and a dispersed sulfonated polymer impart antistatic properties to coatings on a substrate and to self-supporting articles. The preferred colloidal vanadium oxide is alkoxide derived and provides mixed valence vanadium oxide wherein the vanadium ions are typically +4 and +5. Preferred sulfopolymers include sulfopolyesters, sulfopolyurethanes, sulfopolyurethanes/ureas, sulfopolyester polyols, and sulfopolyols. Antistatic composite structures comprising colloidal vanadium oxide and a sulfopolymer are also disclosed.

14 Claims, No Drawings

SULFOPOLYMER/VANADIUM OXIDE ANTISTATIC COMPOSITIONS

This is a division of application Ser. No. 07/893,279, now U. S. Pat. No. 5,427,835 filed Jun. 4, 1992.

FIELD OF THE INVENTION

This invention relates to aqueous-based polymeric compositions comprising colloidal vanadium oxide, a method therefor, and articles comprising this composition. The compositions impart antistatic properties to coatings on a substrate and to self-supporting articles.

BACKGROUND OF THE INVENTION

A build-up of electrical charges, known as "static electricity", can discharge suddenly and cause undesirable sparking particularly in rolled up or fibrous products such as carpets and brushes. It is known in the art that antistatic materials can avoid or compensate for the build-up of static electricity. Preferred antistats are electronic conductors which operate independent of humidity.

Vanadium oxide dispersions are known in the art and have been reported to be effective antistatic layers. Such dispersions can be used in photographic constructions.

Sulfopolymers are known in the art and have been disclosed. Utilities disclosed for these polymers include photoresists, sponges, binders, size coats, and adhesives.

It is known in the art that aqueous copolyester dispersions wherein ionic antistatic agents, such as monosodium salt of vanadic acid, are added can form subbing layers for photographic media.

It has generally not been possible to provide electron conducting, electrically dissipative coatings as thin, transparent, virtually colorless coatings formed from aqueous polymeric solutions or dispersions.

SUMMARY OF THE INVENTION

Briefly, the present invention provides an aqueous-based mixture comprising colloidal vanadium oxide and a dispersed sulfonated polymer. Antistatic coatings derived from aqueous dispersions are particularly desirable because they avoid environmental and waste disposal problems associated with organic solvents.

In another aspect, the invention provides the above-described mixture on a support. A variety of supports can be useful in solid, film, and fibrous forms, and include, for example, polymeric, cellulosic, woven and nonwoven, metal, siliceous, and ceramic supports.

In a further aspect, a dry coating comprising a mixture of vanadium oxide and sulfonated polymer on a support is provided by removal of the aqueous-based liquid.

In yet a further aspect, a self-supporting article is provided which is a mixture, composite, or layered structure comprising colloidal vanadium oxide and sulfopolymer. In one embodiment, the article comprises a layer of vanadium oxide overcoated with sulfopolymer. In another embodiment, the article comprises a layer of sulfopolymer overcoated with vanadium oxide. Such a self-supporting article can be laminated to a desired substrate, optionally in the presence of adhesive.

In still a further aspect, methods for providing the aqueous-based mixture, dry coating, and self-supporting article of the invention are disclosed.

Colloidal dispersions of vanadium oxide useful in the present invention provide a highly dispersed form of vanadium oxide which exhibits desirable morphology, particle size, and dispersion properties useful for the preparation of antistatic coatings and articles.

We have discovered that mixtures of dispersions of vanadium oxide and sulfopolymers will form coatings which have excellent chemical and mechanical durability and which will impart antistatic properties to a substrate. The coatings are generally colorless or have very low color, and, if desired, are homogeneous, and they adhere well to substrates. Additionally, properties of the sulfopolymers such as stain resistance, adhesion to subsequently coated layers, and release are not adversely affected by the presence of vanadium oxide. A further surprising result is that remarkably low levels of vanadium oxide sol produce extremely effective antistatic behavior. Effective antistatic properties can be provided with low or no surface concentrations of vanadium oxide.

Antistatic articles and coatings of the present invention impart desirable properties such as: reduced tendency to attract dust; reduced formation of airborne dust during wood sanding operations; prevention of the formation of static tracks; reduced tendency for sparking or damaging electronic components; reduced film handling difficulties; and non-dependence upon humidity.

In this application,

"sulfopolymer" or "sulfonated polymer" means a polymer comprising at least one unit containing a salt of a —$SO_3H$ group, preferably alkali metal or ammonium salt;

"dispersed sulfonated polymer" means a solution or dispersion of a polymer in water or aqueous-based liquids; particles can be dissolved or they can be dispersed in the liquid medium and can have a maximum dimension of 1 to 10 micrometers;

"colloidal vanadium oxide" means colloidal dispersion of single or mixed valence vanadium oxide, wherein the formal oxidation states of the vanadium ions are typically +4 and +5. In the art, such species are often referred to as $V_2O_5$. In the aged colloidal form (several hours at 80° C. or more or several days at room temperature), vanadium oxide consists of dispersed fibrillar particles of vanadium oxide which preferably have a thickness in the range of 0.02–0.08 micrometers and length up to about 4 micrometers; and "sol", "colloidal dispersion", and "colloidal solution" are used interchangeably and unless otherwise stated mean a uniform suspension of finely divided particles in a continuous liquid medium.

Preferred colloidal dispersions of vanadium oxide for use in compositions of the present invention are disclosed in assignee's copending patent application, U.S. Ser. No. 07,893,504, filed the same date as this application, which application is incorporated herein by reference. The colloidal vanadium oxide dispersions preferably are formed by hydrolysis and condensation reactions of vanadium oxide alkoxides.

DETAILED DESCRIPTION OF PREFERRED EMBODIMENT

Preferred colloidal dispersions of vanadium oxide can be prepared as disclosed in U.S. Pat. No. 4,203,769, which is incorporated herein by reference, and the aforementioned U.S. Ser. No. 07/893,504. The vanadium oxide colloidal dispersions of these two references are similar except the $V^{4+}$ concentrations of the latter are higher and can be controlled. Other advantages of the latter include: energy savings, convenience, elimination of conditions whereby highly toxic vanadium-containing fumes may be generated, no need to filter resultant colloidal dispersions, and ability to prepare colloidal dispersions in situ (in polymer solution).

Most preferred vanadium oxide sols, i.e., colloidal dispersions, useful in the present invention are prepared by hydrolyzing vanadium oxoalkoxides with a molar excess of deionized water. In preferred embodiments, the vanadium oxoalkoxides are prepared in situ from a vanadium oxide precursor species and an alcohol. The vanadium oxide precursor species is preferably a vanadium oxyhalide or vanadium oxyacetate. If the vanadium oxoalkoxide is prepared in situ, the vanadium oxoalkoxide may also include other ligands such as acetate groups.

Preferably, the vanadium oxoalkoxide is a trialkoxide of the formula $VO(OR)_3$, wherein each R is independently an aliphatic, aryl, heterocyclic, or arylalkyl group. Preferably, each R is independently selected from the group consisting of $C_{1-10}$ alkyls, $C_{1-10}$ alkenyls, $C_{1-10}$ alkynyls, $C_{1-18}$ aryls, $C_{1-18}$ arylalkyls, or mixtures thereof, which can be substituted or unsubstituted. "Group" means a chemical species that allows for substitution or which may be substituted by conventional substituents which do not interfere with the desired product. More preferably, each R is independently an unsubstituted $C_{1-6}$ alkyl. When it is said that each R is "independently" selected from a group, it is meant that not all R groups in the formula $VO(OR)_3$ are required to be the same.

In the context of the present invention, the term "aliphatic" means a saturated or unsaturated linear, branched, or cyclic hydrocarbon or heterocyclic radical. This term is used to encompass alkyls, alkenyls such as vinyl radicals, and alkynyls, for example. The term "alkyl" means a saturated linear, cyclic or branched hydrocarbon radical. The term "alkenyl" means a linear, branched, or cyclic hydrocarbon radical containing at least one carbon-carbon double bond. The term "alkynyl" means a linear or branched hydrocarbon radical containing at least one carbon-carbon triple bond. The term "heterocyclic" means a mono- or polynuclear cyclic radical containing carbon atoms and one or more heteroatoms such as nitrogen, oxygen, sulfur or a combination thereof in the ring or rings, such as furan, thymine, hydantoin, and thiophene. The term "aryl" means a mono- or polynuclear aromatic hydrocarbon radical. The term "arylalkyl" means a linear, branched, or cyclic alkyl hydrocarbon radical having a mono- or polynuclear aromatic hydrocarbon or heterocyclic substituent. The aliphatic, aryl, heterocyclic, and arylalkyl groups can be unsubstituted, or they can be substituted with various groups such as Br, Cl, F, I, OH groups, or other groups which do not interfere with the desired product.

The hydrolysis process results in condensation of the vanadium oxoalkoxides to vanadium oxide colloidal dispersions. It can be carried out in water within a temperature range in which the solvent, which preferably is deionized water or a mixture of deionized water and a water-miscible organic solvent, is in a liquid form, e.g., within a range of about 0°–100° C. The process is preferably and advantageously carried out within a temperature range of about 20°–30° C., i.e., at about room temperature. The hydrolysis preferably involves the addition of a vanadium oxoalkoxide to deionized water.

In most preferred embodiments, the deionized water or mixture of deionized water and water-miscible organic solvents contains an effective amount of a hydroperoxide, such as $H_2O_2$. In preferred embodiments the deionized water and hydroperoxide are combined with a water-miscible organic solvent, such as a low molecular weight ketone or an alcohol. Optionally, the reaction mixture also can be modified by the addition of co-reagents, addition of metal dopants, by subsequent aging or heat treatments, and removal of alcohol by-products. By such modifications the vanadium oxide colloidal dispersion properties can be varied.

The vanadium oxoalkoxides can also be prepared in situ from a vanadium oxide precursor species in aqueous medium and an alcohol. For example, the vanadium oxoalkoxides can be generated in the reaction flask in which the hydrolysis, and subsequent condensation, reactions occur. That is, the vanadium oxoalkoxides can be generated by combining a vanadium oxide precursor species, such as, for example, a vanadium oxyhalide ($VOX_3$), preferably $VOCl_3$, or vanadium oxyacetate ($VO_2OAc$), with an appropriate alcohol, such as i-BuOH, i-PrOH, n-PrOH, n-BuOH, t-BuOH, and the like, wherein Bu=butyl and Pr=propyl. It is understood that if vanadium oxoalkoxides are generated in situ, they may be mixed alkoxides. For example, the product of the in situ reaction of vanadium oxyacetate with an alcohol is a mixed alkoxide/acetate. Thus, herein the term "vanadium oxoalkoxide" is used to refer to species that have at least one alkoxide (—OR) group, particularly if prepared in situ. Preferably, the vanadium oxoalkoxides are trialkoxides with three alkoxide groups.

The in situ preparations of the vanadium oxoalkoxides are preferably carried out under an inert atmosphere, such as nitrogen or argon. The vanadium oxide precursor species is typically added to an appropriate alcohol at room temperature. When the reaction is exothermic, it is added at a controlled rate such that the reaction mixture temperature does not greatly exceed room temperature if the reaction is exothermic. The temperature of the reaction mixture can be further controlled by placing the reaction flask in a constant temperature bath, such as an ice water bath. The reaction of the vanadium oxide species and the alcohol can be done in the presence of an oxirane, such as propylene oxide, ethylene oxide, or epichlorohydrin, and the like. The oxirane is effective at removing by-products of the reaction of the vanadium oxide species, particularly vanadium dioxide acetate and vanadium oxyhalides, with alcohols. If desired, volatile starting materials and reaction products can be removed through distillation or evaporative techniques, such as rotary evaporation. The resultant vanadium oxoalkoxide product, whether in the form of a solution or a solid residue after the use of distillation or evaporative techniques, can be added directly to water to produce the vanadium oxide colloidal dispersions of the present invention.

The method of the present invention involves adding a vanadium oxoalkoxide to a molar excess of water, preferably with stirring until a homogeneous colloidal dispersion forms. By a "molar excess" of water, it is meant that a sufficient amount of water is present relative to the amount of vanadium oxoalkoxide such that there is greater than a 1:1 molar ratio of water to vanadium-bound alkoxide. Preferably, a sufficient amount of water is used such that the final colloidal dispersion formed contains less than about 4.5 wt percent and at least a minimum effective amount of vanadium. This typically requires a molar ratio of water to vanadium alkoxide of at least about 45:1, and preferably at least about 150:1. Herein, by "minimum effective amount" of vanadium it is meant that the colloidal dispersion contains an amount of vanadium in the form of vanadium oxide, whether diluted or not, which is sufficient to form an effective sulfonate group-containing polymeric antistatic coating for the use desired.

In preparing preferred embodiments of the vanadium oxide colloidal dispersion of the present invention, a sufficient amount of water is used such that the colloidal dispersion formed contains about 0.05 weight percent to about 3.5 weight percent vanadium. Most preferably, a sufficient amount of water is used so that the colloidal dispersion formed upon addition of the vanadium-containing species contains about 0.6 weight percent to about 1.7 weight percent vanadium. Preferably, the water used in methods of the present invention is deionized water.

In processes of the present invention, the vanadium oxoalkoxides are preferably hydrolyzed by adding the vanadium oxoalkoxides to the water, as opposed to adding the water to the vanadium oxoalkoxides. This is advantageous because it typically results in the formation of a desirable colloidal dispersion and generally avoids excessive gelling.

As long as there is a molar excess of water used in the hydrolysis and subsequent condensation reactions of the vanadium oxoalkoxides, water-miscible organic solvents can also be present. That is, in certain preferred embodiments the vanadium oxoalkoxides can be added to a mixture of water and a water-miscible organic solvent. Miscible organic solvents include, but are not limited to, alcohols, low molecular weight ketones, dioxane, and solvents with a high dielectric constant, such as acetonitrile, dimethylformamide, dimethylsulfoxide, and the like. Preferably, the organic solvent is acetone or an alcohol, such as i-BuOH, i-PrOH, n-PrOH, n-BuOH, t-BuOH, and the like.

Preferably, the reaction mixture also contains an effective amount of hydroperoxide, such as $H_2O_2$ or t-butyl hydrogen peroxide. An "effective amount" of a hydroperoxide is an amount that positively or favorably effects the formation of a colloidal dispersion capable of producing an antistatic coating with an effective antistatic coating value of $[V]_{eff}$ defined below, of less than about 2.0 mg/m$^2$. The presence of the hydroperoxide appears to improve the dispersive characteristics of the colloidal dispersion and facilitate production of an antistatic coating with highly desirable properties. That is, when an effective amount of hydroperoxide is used the resultant colloidal dispersions are less turbid, and more well dispersed. Preferably, the hydroperoxide is present in an amount such that the molar ratio of vanadium oxoalkoxide to hydroperoxide is within a range of about 1:1 to 4:1.

Other methods known for the preparation of vanadium oxide colloidal dispersions, which are less preferred, include inorganic methods such as ion exchange acidification of $NaVO_3$, thermohydrolysis of $VOCl_3$, and reaction of $V_2O_5$ with $H_2O_2$. To provide coatings with effective antistatic properties from dispersions prepared with inorganic precursors typically requires substantial surface concentrations of vanadium, which generally results in the in the loss of desirable properties such as transparency, adhesion, and uniformity.

For most uses, an effective antistatic coating has a coating weight of vanadium ($[V]_{eff}$, calculated in mg of vanadium per m$^2$ of substrate surface area) of less than about 12 mg/m$^2$; however, for some end uses a value of $[V]_{eff}$ up to about 20 mg/m$^2$ can be tolerated. For preferred uses, however, it is desirable that the antistatic coating have a $[V]_{eff}$ of less than about 6 mg/m$^2$, and preferably the value of $[V]_{eff}$ is less than about 3 mg/m$^2$. Generally, lower coating weights of vanadium for effective conduction of electrostatic charges are advantageous and commercially desirable because lower coating weight vanadium oxide coatings are generally less colored, more uniform, more economical and may possess better adhesion properties than coatings with higher concentration of vanadium. Thickness of the final coating is more dependent on the concentration of polymer rather than the concentration of $V_2O_5$.

The value of $[V]_{eff}$ is the calculated coating weight of vanadium required to provide electrostatic charge decay times of less than 0.10 seconds for decay of a 5000 V potential to less than 50 V. The surface concentration of vanadium in the antistatic coatings of the present invention can be calculated from formulation data, assuming 100% conversion of the vanadium oxoalkoxide to the vanadium oxide colloidal dispersion, and also assuming the density of each successively diluted vanadium oxide colloidal dispersion is that of water (1.0 g/mL), and the wet coating thickness, when applied using a No. 3 Mayer Bar, is about 6.9 μm.

A wide variety of sulfopolymers can be used in the antistatic compositions of the present invention. Preferred sulfopolymers of use in the compositions and articles of the present invention have been disclosed in, for example, U.S. Pat. Nos. 4,052,368, 4,307,219, 4,330,588, 4,558,149, 4,738,992, 4,746,717, and 4,855,384 which are incorporated herein by reference for the composition and preparation of sulfopolymers and sulfocompounds. Disclosed in these patents are polymers including sulfopolyesters, ethylenically-unsaturated sulfopolymers, sulfopolyurethanes, sulfopolyurethane/polyureas, sulfopolyester polyols, and sulfopolyols.

Also useful are commercially available sulfonate-containing polymers such as poly(sodiumstyrene sulfonate) available from Polyscience, Inc., Warrington, Pa., and alkylene oxide-co-sulfonate-containing polyester (AQ™ resins, Eastman Kodak Co., Kingsport, Tenn.).

Sulfopolyols, including sulfopolyether polyols or sulfopolyester polyols, are known in the literature for a variety of applications, primarily as precursors to other types of sulfopolymers such as sulfopolyurethanes or sulfonate containing radiation curable materials. Preparation of these sulfopolyols is disclosed, for example, in U.S. Pat. Nos. 4,503,198, 4,558,149, and 4,738,992. These polyols which can be used in the present invention may generally be described by the formula taken from U.S. Pat. No. 4,738,992:

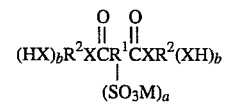

where
  a is an integer of 1,2, or 3;
  b is an integer of 1,2, or 3;
  M can be a cation selected from alkali metal cation such as sodium, potassium, or lithium; or suitable tertiary, and quaternary ammonium cations having 0 to 18 carbon atoms, such as ammonium, hydrazonium, N-methyl pyridinium, methylammonium, butylammonium, diethylammonium, triethylammonium, tetraethylammonium, and benzyltrimethylammonium.
  X preferably is —O—.
  $R^1$ can be an arenepolyyl group (polyvalent arene group)

having a valence of (a+2) and having 6 to 12 carbon atoms or an alkanepolyyl group (polyvalent alkane) having 2 to 20 carbon atoms remaining after the removal of two carboxyl groups and "a" sulfo groups from suitable sulfoarene and sulfoalkane dicarboxylic acids; said group being incorporated into the sulfopolyurethane backbone by the selection of suitable sulfo-substituted dicarboxylic acids such as sulfoalkanedicarboxylic acids including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid; sulfobenzylmalonic acid esters such as those described in U.S. Pat. No. 3,821,281; sulfophenoxymalonate such as described in U.S. Pat. No. 3,624,034; and sulfofluorenedicarboxylic acids such as 9,9-di-(2'-carboxyethyl)-fluorene-2-sulfonic acid. It is to be understood that the corresponding lower alkyl carboxylic esters of 4 to 12 carbon atoms, halides, anhydrides, and sulfo salts of the above sulfonic acids can also be used.

$R^2$ is an independently selected linear or branched organic group having a valence of (b+1) that is the residue of an aliphatic or aromatic polyether or polyester polyol.

Polyols (aliphatic or aromatic polyols) useful in preparation of the sulfocompounds have a molecular weight of 62 up to about 2000 and include, for example, monomeric and polymeric polyols having two to four hydroxyl groups. Examples of the monomeric polyols include ethylene glycol, propylene glycol, butylene glycol, hexamethylene glycol, cyclohexamethylenediol, 1,1,1-trimethylolpropane, and the adipic or sebacic acid, etc; and polyhydric alcohols such as aliphatic diols including ethylene glycol, propylene glycol, and 1,6-hexanediol.

Sulfopolyols with glass transition temperatures above room temperature (e.g. Tg greater than 25° C. as measured by differential scanning calorimetry) are useful for obtaining non-tacky coatings on various substrates.

Water dispersible sulfopolyesters are known in the literature and are utilized for a wide variety of applications including primers, size coats, subbing for photographic emulsions, hydrophilic coatings for stain release, lithographic binders, hair grooming, and adhesives. In some instances, these sulfopolyesters are dispersed in water in conjunction with an emulsifying agent and high shear to yield a stable emulsion; sulfopolyesters may also be completely water soluble. Additionally, stable dispersions may be produced in instances where sulfopolyesters are initially dissolved in a mixture of water and an organic cosolvent, with subsequent removal of the cosolvent yielding an aqueous sulfopolyester dispersion.

Sulfopolyesters disclosed in U.S. Pat. Nos. 3,734,874, 3,779,993, 4,052,368, 4,104,262, 4,304,901, 4,330,588, for example, relate to low melting (below 100 ° C.) or non-crystalline sulfopolyesters which may be dispersed in water according to methods mentioned above. In general, sulfopolyesters of this type may be best described by the following formula:

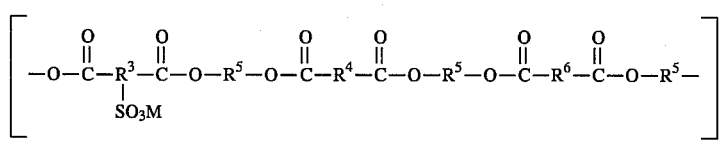

like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols, and tetrols such as the Carbowax™ polyols available from Union Carbide, Danbury, Conn., the polyester polyols such as the Multron™ poly(ethyleneadipate) polyols available from Mobay Chemical Company, Pittsburgh, Pa., and the polycaprolactone polyols such as the PCP™ polyols available from Union Carbide. Examples of aromatic polyols include the polyester polyols that are prepared from aromatic dicarboxylic acids such as the phthalic acids and excess diols such as diethylene glycol, triethylene glycol, etc.; and from dicarboyxlic acids such as adipic acid and resorcinol. The polymeric polyols that have a molecular weight of about 300 to 1000 are preferred.

The sulfopolyol is generally obtained by the esterification reaction of the sulfo-substituted dicarboxylic acid derivative with the polyols described above. Examples of typical esterification conditions are disclosed in the Examples of U.S. Pat. No. 4,558,149.

Alternatively, sulfopolyols may be produced according to the method disclosed in U.S. Pat. No. 4,503,198 wherein non-symmetric sulfopolyols are obtained by the reaction of sulfonate containing dicarboxylic acids such as those described above, with a carboxylic acid component such as aromatic dicarboxylic acids including terephthalic acid or 1,5-naphthalic acid, or aliphatic dicarboxylic acids such as where M can be an alkali metal cation such as sodium, potassium, or lithium; or suitable tertiary, and quaternary ammonium cations having 0 to 18 carbon atoms, such as ammonium, hydrazonium, N-methyl pyridinium, methylammonium, butylammonium, diethylammonium, triethylammonium, tetraethylammonium, and benzyltrimethylammonium.

$R^3$ can be an arylene or aliphatic group incorporated in the sulfopolyester by selection of suitable sulfo-substituted dicarboxylic acids such as sulfoalkanedicarboxylic acids including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid; sulfobenzylmalonic acid esters such as those described in U.S. Pat. No. 3,821,281; sulfophenoxymalonate such as described in U.S. Pat. No. 3,624,034; and sulfofluorenedicarboxylic acids such as 9,9-di-(2'-carboxyethyl)-fluorene-2-sulfonic acid. It is to be understood that the corresponding lower alkyl carboxylic esters of 4 to 12 carbon atoms, halides, anhydrides, and sulfo salts of the above sulfonic acids can also be used.

$R^4$ can be optionally incorporated in the sulfopolyester by the selection of one or more suitable arylenedicarboxylic acids, or corresponding acid chlorides, anhydrides, or lower alkyl carboxylic esters of 4 to 12 carbon atoms. Suitable acids include the phthalic acids (orthophthalic, terephthalic, isophthalic), 5-t-butyl isophthalic acid, naphthalic acids (e.g., 1,4- or 2,5-napthalene dicarboxylic), diphenic acid, oxydibenzoic acid, anthracene dicarboxylic acids, and the like. Examples of suitable esters or anhydrides include dimethyl isophthalate or dibutyl terephthalate, and phthalic anhydride.

$R^5$ can be incorporated in the sulfopolyester by the selection of one or more suitable diols including straight or branched chain alkylenediols having the formula $HO(CH2)_cOH$ in which c is an integer of 2 to 12 and oxaalkylenediols having a formula $H-(OR^5)d-OH$ in which $R^5$ is an alkylene group having 2 to 4 carbon atoms and d is an integer of 1 to 6, the values being such that there are no more than 10 carbon atoms in the oxaalkylenediol.

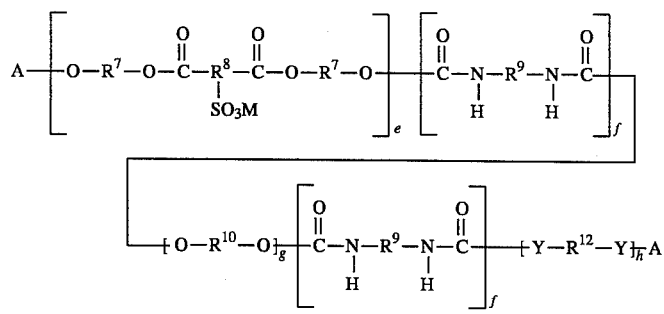

Examples of suitable diols include ethyleneglycol, propyleneglycol, 1,5-pentanediol, 1,6-hexanediol, 1,8-octanediol, 1,10-decanediol, 2,2-dimethyl-1,3-propanediol, 2,2-diethyl-1,3-propanediol, 3-methyl-1,5-pentanediol, diethyleneglycol, dipropyleneglycol, diisopropyleneglycol, and the like. Also included are suitable cycloaliphatic diols such as 1,4-cyclohexanedimethanol, 1,3-cyclohexanedimethanol, and the like. Suitable polyester or polyether polyols may used such as polycaprolactone, polyneopentyl adipate, or polyethyleneoxide diols up to 4000 in molecular weight, and the like; generally these polyols are used in conjunction with lower molecular weight diols such as ethylene glycol if high molecular weight polyesters are desired.

$R^6$ can be incorporated in the sulfopolyester by the selection of suitable aliphatic or cycloaliphatic dicarboxylic acids or corresponding acid chlorides, anhydrides or ester derivatives; such as acids having the formula $HOOC(CH_2)_eCOOH$, wherein e is an integer having an average value of 2 to 8 (e.g. succinic acid, adipic acid, maleic acid, glutaric acid, suberic acid, sebacic acid, and the like). Suitable cycloaliphatic acids include cyclohexane-1,4-dicarboxylic acid, and the like.

The sulfopolyesters of this invention can be prepared by standard techniques, typically involving the reaction of dicarboxylic acids (or diesters, anhydrides, etc. thereof) with monoalkylene glycols and/or polyols in the presence of acid or metal catalysts (e.g., antimony trioxide, zinc acetate, p-toluene sulfonic acid, etc.), utilizing heat and pressure as desired. Normally, an excess of the glycol is supplied and removed by conventional techniques in the later stages of polymerization. When desired, a hindered phenol antioxidant may be added to the reaction mixture to protect the polyester from oxidation. To ensure that the ultimate polymer will contain more than 90 mole % of the residue of monoalkylene glycols and/or polyols, a small amount of a buffering agent (e.g. sodium acetate, potassium acetate, etc.) is added. While the exact reaction mechanism is not known with certainty, it is thought that the sulfonated aromatic dicarboxylic acid promotes the undesired polymerization of the glycol per se and that this side reaction is inhibited by a buffering agent.

Water dispersible sulfopolyurethanes or sulfopolyurethane/ureas are known in the literature and are widely utilized as textile and paper coatings, binders for nonwoven webs, adhesives, size coats for glass and fiber, abrasion resistant coatings, etc. Sulfopolyurethanes may be synthesized by a wide variety of methods. In general, one major class of random, linear sulfopolyurethanes as are disclosed in U.S. Pat. No. 4,307,219, may be best described by the following formula:

where e, f, g, and h can be numbers expressing the mole ratios of polyurethane hydrophilic, connecting, hydrophobic and chain extending segments within the respective parentheses in which e is 1, g is 0.1 to 20, h is 0 to 20, and f is (e+g+h). The values of e, f, g, and h should be chosen with regard to the subsequent molecules selected in the construction of the sulfopolyurethane such that there is one sulfonate group per about 1000 to 8000 molecular weight of the sulfopolyurethane, each A can be independently selected from monovalent terminal groups, M can be a cation as defined above, $R^7$ can be the residue remaining after removal of terminal hydroxyl groups from one or more diols, $HO-R^7-OH$, the diols having a number average molecular weight between about 150 and 3500. Suitable diols are selected from polyoxyalkylene diols, polyester diols, and polylactone diols such as polycaprolactone or polyethyleneoxide diols of 150 to 3500 weight average molecular weight, $R^8$ can be an arenetriyl group having 6 to 12 carbon atoms or an alkanetriyl group having 2 to 12 carbon atoms, said group being incorporated into the sulfopolyurethane backbone by the selection of suitable sulfo-substituted dicarboxylic acids such as sulfoalkanedicarboxylic acids including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid; sulfobenzylmalonic acid esters such as those described in U.S. Pat. No. 3,821,281; sulfophenoxymalonate such as described in U.S. Pat. No. 3,624,034; and sulfofluorenedicarboxylic acids such as 9,9-di-(2' -carboxyethyl)-fluorene-2-sulfonic acid. It is to be understood that the corresponding lower alkyl carboxylic esters of 4 to 12 carbon atoms, halides, anhydrides, and sulfo salts of the above sulfonic acids can also be used, $R^9$ is the residue remaining after removal of —NCO groups from polyisocyanates, OCN—$R^9$—NCO, in which $R^9$ is arylene or alkylarylene having 6 to 12 carbon atoms, cycloalkylene having 5 to 12 carbon atoms, or divalent 5 or 6 atom containing azacyclic groups having 3 to 10 carbon atoms and 1 to 3 —NCO groups. Suitable polyisocyanates for use as the connecting segment are any of the aliphatic, aromatic, and heterocyclic polyisocyanates known in the polyurethane field. Examples of preferred diisocyanates include 2,4-tolylene diisocyanate, 3,5,5-trimethyl-1-isocyanato-3-isocyanato-methylcyclohexane, methylene bis-(4-cyclohexylisocyanate), 4,4'-diisocyanato-diphenyl methane, etc., $R^{10}$ is the residue remaining after removal of hydroxyl groups from one or more hydrophobic diols, HO—$R^{10}$—OH, having a weight average molecular weight of about 400 to 4000. Suitable hydrophobic diols can be derived from the same generic families of diols HO—$R^7$—OH, mentioned above, with exclusion of polyoxyethyleneglycols. Suitable hydrophobic diols can have a number average molecular weight of about 400 to 4000, and preferably from about 500 to 2000. With decreasing molecular weights of the hydrophobic diol, the influence of the hydrophilic segment increases so that at molecular weights below 400, the polyurethanes become water soluble. With increasing molecular weights, the influence of the hydrophilic segment decreases so that as molecular weights of the hydrophobic diol are increased above about 4000, the polyurethane becomes less and less dispersible in aqueous organic solvents, Y can be —O—, —S—, or —N($R^{11}$)— in which $R^{11}$ is hydrogen or lower alkyl of from 1 to 4 carbon atoms, $R^{12}$ can be the residue remaining after the removal of terminal active hydrogen containing groups from chain extender compounds having two Zerewitinoff hydrogen atoms reactive with isocyanate groups and having a weight average molecular weight of from about 18 to about 200. Suitable chain extenders include any compound having two active hydrogen containing groups, and a molecular weight between 18 and about 200. Suitable compounds include water, diols, amines, bis-(monoalkylamine) compounds, dihydrazides, dithiols, and the like. Preferred chain extenders are the diols having the formula HO(CH$_2$)$_i$OH in which i is an integer of 2 to 12; glycols of the formula HO(—CH$_2$O—)$_j$—H, in which j is an integer of 1 to 6; glycols of the formula HO—(CH(CH$_3$)CH$_2$O—)$_k$—H, in which k is an integer of 1 to 4, e.g. ethylene glycol, propylene glycol, diethylene glycol, diisopropylene glycol, and the like, and 2,2-dimethyl-1,3-propanediol, 1,4-cyclohexanediol, 1,4-(dihydroxymethyl)cyclohexane, and the like.

The sulfopolyurethanes useful in this invention can be prepared by standard techniques beginning with the preparation of the hydrophilic diol from the diesterification reaction of the $R^8$ containing sulfoacid and the $R^7$ group-containing diol as described above. The aqueous dispersible sulfopolyurethanes are then prepared by the coreaction of the diisocyanate with the hydrophilic diol, hydrophobic diol, and where used, chain-extenders under essentially anhydrous conditions in an organic solvent such as methyl ethyl ketone or tetrahydrofuran, as described in U.S. Pat. No. 4,307,219.

Other representative methods for making sulfopolyurethane dispersions are disclosed in a review article "Aqueous Dispersions of Crosslinked Polyurethanes" (R. E. Tirpak and P. H. Markusch; Journal of Water Borne Coatings, November 1986, pp.12–22), and U.S. Pat. Nos 4,307,219, 4,408,008, and 3,998,870. Methods of preparing sulfonate containing polyurethane dispersions described in these references include the use of sulfonate containing polyethyleneoxide monoalcohols, sulfonate containing diamines, low molecular weight sulfonic acid containing diols which are the reaction product of sodium bisulfite and alkene containing diols, and sulfonic acid containing isocyanates in conjunction with diols, di- or tri-amines, and diisocyanates as described above. The general method of preparation varies according to the sulfonated molecule used as taught in the references cited above.

Water dispersible ethylenically unsaturated sulfocompounds are known in the literature, for example U.S. Pat. Nos. 4,503,198, 4,558,149, 4,746,717, and 4,855,384. These energy-curable sulfocompounds may be used to form crosslinked, adherent, abrasion-resistant coatings on a variety of substrates for uses such as photoresists, graphic arts applications (e.g. lithographic printing plates, color separation images, flexographic printing plates), and the like. An important class of these sulfocompounds which are disclosed in the above references may be best described by the following formula:

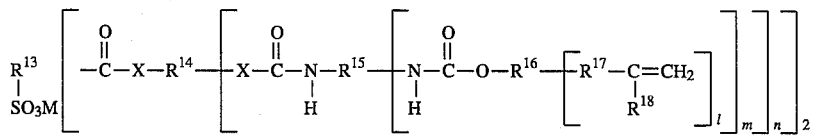

where
 l is an integer of 1, 2, or 3;
 m is an integer of 1, 2, or 3;
 n is an integer of 1, 2, or 3;
 M can be a cation as defined above.

$R^{13}$ is an arenetriyl group having 6 to 20 carbon atoms or an alkanetriyl group having 2 to 12 carbon atoms, said group being incorporated into the sulfopolyurethane backbone by the selection of suitable sulfo-substituted dicarboxylic acids such as sulfoalkanedicarboxylic acids including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid; sulfobenzylmalonic acid esters such as those described in U.S. Pat. No. 3,821,281; sulfophenoxymalonate such as described in U.S. Pat. No. 3,624,034; and sulfofluorenedicarboxylic acids such as 9,9-di-(2'-carboxyethyl)-fluorene-2-sulfonic acid. It is to be understood that the corresponding lower alkyl carboxylic esters of 4 to 12 carbon atoms, halides, anhydrides, and sulfo salts of the above sulfonic acids can also be used.

X can be independently —O— or —NH—.

$R^{14}$ is a linear aliphatic group having a valence of (v+1), wherein v can be 1, 2, or 3, that is the residue remaining after removal of terminal hydroxyl or amine groups from one or more polyether or polyester polyols or polyamines, having a number average molecular weight of up to 2000. Suitable diols are selected from polyoxyalkylene diols, polyester diols, and polylactone diols such as polycaprolactone or polyethyleneoxide diols of 150 to 3500 molecular weight. Suitable aliphatic polyols having a molecular weight of 62 to 1000 include ethylene glycol, propylene glycol, and the like; and polymeric polyols of 106 to 2000 in weight average molecular weight such as polyethyleneoxide diols, triols, and tetrols such as the Carbowax™ polyols available from Union Carbide, or polyethylene adipate or polycaprolactone polyols. Suitable aliphatic polyamines include polyoxypropylene diamines such as those available from Texaco under the trade name Jeffamine™, or hydrazino compounds such as adipic dihydrazide or ethylene dihydrazine.

$R^{15}$ is the residue from the reaction of suitable isocyanato compounds such as hexamethylene diisocyanate, toluene diisocyanate, isophorone diisocyanate, 3,5,5 -trimethyl-1-isocyanto-3-isocyanatomethylcyclohexane, 4,4'-diphenylmethane diisocyanate, and the polymethylpolyphenylisocyanates. Mixtures of polyisocyanates can also be used such as the mixture of methyldiisocyanate (MDI) and trifunctional isocyanate available from Dow Chemical Company known as Isonate™ 2143L.

$R^{16}$ is a polyvalent aliphatic group selected from linear and branched alkyl groups having a valence of (1+1) where 1 is as defined above, 2 to 12 carbon atoms, that can be interrupted by one nonperoxidic caternary oxygen atom and/or one —C(=O)NH— group and alicyclic groups having a 5- or 6-atom carbocyclic structure optionally substituted by up to 4 lower alkyl groups having 1 to 4 carbon atoms and a total of up to 12 carbon atoms as disclosed in U.S. Pat. No. 4,855,384.

$R^{17}$ is —C(=O)O— or —C(=O)NH—. $R^{18}$ is a hydrogen or methyl group. In conjunction with $R^{16}$, $R^{17}$ and $R^{18}$ are incorporated in the ethylenically substituted sulfocompound by the selection of appropriate ethylenically substituted compounds such as 2-alkenylazlactones (e.g. 2-ethenyl-1,3-oxazolin-5one), isocyanate substituted ethylenically unsaturated compounds such as 2-isocyanatoethyl methacrylate, or ethylenically unsaturated alcohols such as allyl and methallyl alcohols, 2-hydroxy acrylate and methacrylate, 1,1,1 -trimethylolpropane diacrylate, pentaerythritol triacrylate and methacrylate, and the like.

Such ethylenically unsaturated compounds can be incorporated into the ethylenically unsaturated sulfocompound depicted above according to procedures described in U.S. Pat. No. 4,855,384. In general these compounds may be prepared by the sequential reaction of the sulfopolyol with the isocyanate, followed by reaction with hydroxyl substituted ethylenically unsubstituted compounds under anhydrous conditions; or by reaction of the sulfocompound with appropriate 2-alkenylazlactone or isocyanate substituted acrylate or acrylamido compounds. Other variations are described in U.S. Pat. No. 4,855,384, or are known by those skilled in the art.

The coating composition can be prepared by dispersing the sulfopolymer in water, optionally with water-miscible solvent (generally less than 50 weight percent cosolvent). The dispersion can contain more than zero and up to about 50 percent by weight sulfo-containing polymer, preferably in the range of 10 to 25 weight percent sulfo-containing polymer. Organic solvents miscible with water can be added. Examples of such organic solvents that can be used include acetone, methyl ethyl ketone, methanol, ethanol, and other alcohols and ketones. The presence of such solvents is desirable when need exists to alter the coating characteristics of the coating solution.

For preparation of the mixture of colloidal vanadium oxide and sulfonate-containing polymer a most preferred colloidal dispersion of vanadium oxide can be prepared, as noted above, by the hydrolysis of a vanadium oxoalkoxide with a molar excess of deionized water. These dispersions can be brown in color, thus imparting a yellow or brown tint to the final coating. A preferred preparation is the addition of vanadium iso-butoxide to a hydrogen peroxide solution, as described in detail below.

The sulfopolymer/vanadium oxide compositions of the present invention can comprise any ratio of these components. For ease of coatability, these compositions preferably comprise more than zero (as little as about 0.05 weight percent, preferably as little as 0.15 weight percent, dried solids can be useful) and up to about 15 percent by weight solids. More preferably, the compositions comprise more than zero and up to 10 weight percent solids, and most preferably more than zero and up to 6 weight percent solids. In the dried solids there can be in the range of 0.2 to 80 weight percent vanadium oxide and 20 to 99.8 weight percent sulfopolymer, preferably 0.2 to 50 weight percent vanadium oxide and 50 to 99.8 weight percent sulfopolymer, most preferably 0.5 to 20 weight percent vanadium oxide and 80 to 99.5 weight percent sulfopolymer, based on total dried solids. It is to be appreciated that vanadium accounts for about 56 percent of the molecular weight of $V_2O_5$, so weight percent of vanadium can be readily calculated by multiplying weight percent $V_2O_5$ by 0.56.

The vanadium oxide dispersion can be diluted with deionized water to a desired concentration before mixing with the aqueous sulfopolymer dispersions. Dispersions containing very small amounts of vanadium oxide can provide useful coating for the present invention. In all cases the amount of vanadium oxide present is sufficient to confer antistatic properties to the final coating or article. The use of deionized water avoids problems with flocculation of the colloidal particles in the dispersions. Deionized water has had a significant amount of Ca(2+) and Mg(2+) ions removed. Preferably, the deionized water contains less than about 50 ppm of these multivalent cations, most preferably less than 5 ppm.

The sulfopolymer dispersion and the vanadium oxide dispersion are mixed together. Generally, this involves stirring the two dispersions together for sufficient time to effect complete mixing. If other materials or particles are to be incorporated into the coating mixture, however, it is frequently more convenient to stir the mixture for several hours by placing the mixture into a glass jar containing several glass beads and roll milling it. Surfactants can be added at the mixing step. Any water compatible surfactant, except those of high acidity or basicity or complexing ability, or which otherwise would interfere with the desired product, is suitable for the practice of this invention. A suitable surfactant does not alter the antistatic characteristics of the coating, but allows for the uniform wetting of a substrate surface by the coating solution. Depending upon the substrate, wetting out completely can be difficult, so it is sometimes convenient to alter the coating composition by the addition of organic solvents. It is apparent to those skilled in the art that the addition of various solvents is acceptable, as long as it does not cause flocculation or precipitation of the sulfopolymer or the vanadium oxide.

Alternatively, the vanadium oxide dispersion can be generated in the presence of a sulfopolymer or prepolymer by, for example, the addition of VO(OiBu)$_3$ (vanadium triisobutoxide oxide) to a dispersion of polymer, optionally containing hydrogen peroxide, and aging this mixture at 50° C. for several hours to several days. In this way, colloidal vanadium oxide dispersions can be prepared in situ with dispersions with which they might otherwise be incompatible, as evidenced by flocculation of the colloidal dispersion. Alternatively, this method simply may be a more convenient preparation method for some dispersions.

Substrates useful for the practice of this invention are any non-conductive or conductive substrate. Many polymeric films would benefit greatly from an antistatic coating, depending on the method of their use. These include polyester such as polyethyleneterephthalate (PET), copolyesters, polyamide, polyimide, polyepoxides, polycarbonate, polyolefins such as polyvinyl chloride, polyvinylidene chloride, polystyrene, or polypropylene or polyethylene, or poly(vinylacetate), polyacrylates such as polymethylmethacrylate, cellulosics, and ceramics or siliceous materials. Fibrous materials containing, for example, polyolefin, nylon and/or wool would also benefit from antistatic coatings.

The coatings prepared from the sulfopolymer/vanadium oxide colloidal dispersions of the present invention typically contain whisker shaped colloidal particles of vanadium oxide. These particles can have a high aspect ratio, (i.e., greater than 10 and even as high as 200) and are generally evenly distributed. The colloidal particles were examined by field emission scanning electron microscopy. The micrographs showed evenly dispersed, whisker-shaped colloidal particles of vanadium oxide, approximately 0.02 to 0.08 micrometers wide and 1.0 to 4.0 micrometers long.

These dispersions can be hand spread (for example, by Mayer bar), or coatings can be made by dip coating, spin coating, or roll coating. Coatings can also be formed by spray coating, although this is less preferred.

Once the dispersion is coated out, the coated film can be dried, generally at a temperature from room temperature up to a temperature limited by substrate and sulfopolymers, preferably room temperature to 200° C., most preferably 50° to 150° C., for a few minutes. The dried coating weight preferably can be in the range of 3 mg/m$^2$ to 20 g/m$^2$. In certain embodiments the coating can be stripped from the support to provide a self-supporting article.

In the Examples below, the antistatic properties of the coated film were measured by determining the charge decay time of the coated sample; i.e., by applying voltage and measuring the time required for the charge to dissipate. This measurement was done on a Static Decay Meter (Model 406C, Electro-Tech Systems, Inc., Glenside, Pa.), wherein the voltage was applied at 5000 volts and the time for the electric field to decay to less than 50 volts was measured.

It is within the scope of the present invention to incorporate a protective layer (e.g., having at least one of the properties of abrasion resistance, solvent resistance, low-friction characteristics, etc.) in any of the articles of the invention.

Fibrous materials, woven and non-woven fabrics including carpets, brush products useful in the wood finishing and paint industry, or electronic industry, photographic materials, adhesive or other tapes, transparency films, packaging materials, electronic devices which have an inherent propensity to build up static charges, are useful as substrates for this invention. A brush product, comprising for example, nylon, polypropylene, polyester, or polyethylene bristles, is commercially available under the trade designation BRUSHLON™ available from 3M Co., St. Paul, Minn. The bristles are embedded into a base layer by means of a binder. A typical base layer is polyurethane, polypropylene, or the like. One family of these products contains abrasive grit and is commonly used in finishing operations for both metal and wood. A stable, adherent antistatic coating on the brush bristles is a valuable modification of the product. Another family of these products is produced without abrasive media and used to produce a glossy, smooth finish on a wood or metal workpiece, or is used as conveyor media for electronic components. It is useful to have an adherent, stable, and economical antistatic material to use for these purposes.

The compositions of the present invention are also useful for many types of packaging materials such as are used with electronic components. Many types of packaging materials such as dual-in-line packaging tubes (DIP tubes), flat pack trays, carrier tapes, and static shield bags benefit from antistatic coatings of the present invention. In addition, magnetic media which can be disks, tape, etc., preferably on polyamide, polyimide or polyester supports, and these supports can be used as substrates for coatings of the present invention to provide antistatic properties to these materials.

Objects and advantages of this invention are further illustrated by the following examples, but the particular materials and amounts thereof recited in these examples, as well as other conditions and details, should not be construed to unduly limit this invention.

In the Examples below, all percents are by weight unless otherwise indicated below.

I. PREPARATION AND DESCRIPTION OF SULFOPOLYMERS

Materials list

| Materials list | |
|---|---|
| 4,4'-azobis(4-cyanovaleric acid) | Wako Chemical Co., Dallas, Texas |
| cyclohexanedimethanol | Eastman Chemical Products, Inc., Kingsport, Tennessee |
| 2,2-diethyl-1,3-propanediol | Eastman Chemical Products, Inc. |
| dimethyl adipate | Aldrich Chemical Co., Milwaukee, Wisconsin |
| dimethyl isophthalate | Amoco Chemical Co., Chicago, Illinois |
| dimethyl 5-sodiosulfoisophthalate | E.I. DuPont de Nemours, Wilmington, Delaware |
| dimethyl terephthalate | Amoco Chemical Co. |
| isocyanatoethylmethacrylate | Dow Chemical Co., Midland, Michigan |
| polycaprolactone diol PCP ™-0200, molecular weight = 530 | Union Carbide, Danbury, Connecticut |
| 5-sodiosulfoisophthalic acid | Pfister Chemical, Ridgfield, New Jersey |
| 2,4-toluene diisocyanate | Aldrich Chemical Co. |
| Triton ™ X-100 (octylphenoxy-polyethyoxyethanol | Rohm and Haas, Philadelphia, Pennsylvania |
| antimony oxide | Fisher Scientific Co., Fairlawn, New Jersey |
| dibutyl tin dilaurate | Aldrich Chemical Co. |
| tetraisopropyl titanate | Matheson, Coleman and Bell, Norwood, Ohio |
| ethane sulfonic acid | Aldrich Chemical Company |
| poly(sodium styrene-sulfonate) MW = 2000 | Polysciences, Inc. Warrington, PA |
| poly(sodium styrene-sulfonate) MW = 50000 | Scientific Polymer Products, Inc. Ontario, NY |

Synthesis of Sulfopolyester (Polymer A)

A one gallon polyester kettle was charged with 126 g (6.2 mole %) dimethyl 5-sodiosulfoisophthalate, 1002.6 g (75 mole %) dimethyl terephthalate, 251.3 g (18.8 mole %)

dimethyl isophthalate, 854.4 g (200 mole %) ethylene glycol, 365.2 g (10 mole %, 22 weight % in final polyester), polycaprolactone diol (trade designation PCP-0200™ from Union Carbide), 0.7 g antimony oxide, and 2.5 g sodium acetate. The mixture was heated with stirring to 180° C. at 138 kPa (20 psi) under nitrogen, at which time 0.7 g zinc acetate (an esterification catalyst) was added. Methanol evolution was observed. The temperature was increased to 220° C. and held for 1 hour. The pressure was then reduced, vacuum applied (0.2 torr), and the temperature was increased to 260° C. The viscosity of the material increased over a period of 30 minutes, after which time a high molecular weight, clear, viscous sulfopolyester was drained. This sulfopolyester was found by Differential Scanning Calorimetry (DSC) to have a $T_g$ of 50.1° C. The theoretical sulfonate equivalent weight was 3954 g polymer per mole of sulfonate.

500 g of the polymer was dissolved in a mixture of 2000 g water and 450 g isopropanol at 80° C. The temperature was then increased to 95° C. in order to remove the isopropanol (and a portion of the water), yielding a 22% solids aqueous dispersion.

Synthesis of Sulfopolyester (Polymer B)

A 1 gallon polyester kettle was charged with 151.2 g (8.5 mole) dimethyl 5-sodiosulfoisophthalate, 833.5 g (71.5 mole %) dimethyl terephthalate, 233.2 g (20 mole %) dimethyl isophthalate, 745.1 g (200 mole %) ethylene glycol, 637.0 g polycaprolactonediol (PCP-0200, 20 mole %, 36 weight % of the resulting polyester), 0.6 g antimony oxide, and 3.0 g sodium acetate. The mixture was heated with stirring to 180° C. at 138 kPa (20 psi) under nitrogen, at which time 0.7 g zinc acetate (an esterification catalyst) was added. The polymerization proceeded according to the procedure used for Polymer A, yielding a tough, clear sulfopolyester. This sulfopolyester was found by DSC to have a $T_g$ of 21.8° C. The theoretical sulfonate equivalent weight was 3462 g polymer per mole of sulfonate.

A 20% solids aqueous dispersion was obtained using the procedure disclosed above for Polymer A. A cast, dried film of this sulfopolyester had a tensile strength at break of 16,260 kPa (2358 psi), with an elongation at break of 387%.

Synthesis of Sulfopolyester (Polymer C)

A 1000 ml three-necked round bottom flask equipped with a sealed stirrer, thermometer, reflux condenser and means for reducing pressure was charged with 134.03 g dimethyl terephthalate (65 mole percent)

47.19 g dimethyl sodium sulfoisophthalate (15 mole percent)

36.99 g dimethyl adipate (20 mole percent)

131.79 g ethylene glycol (100 mole percent)

0.11 grams antimony trioxide, and 0.94 gram sodium acetate.

The mixture was stirred and heated to 155° C. and maintained at 155° C. to 180° C. for about 2 hours while methanol distilled. When the temperature reached 180° C., 0.5 grams zinc acetate (an esterification catalyst) was added. The temperature was slowly increased to 230° C. over a period of 5 hours, during which time methanol evolution was completed. The pressure in the flask was reduced to 0.5 Torr or lower, whereupon ethylene glycol distilled, about 60 grams being collected. The temperature was then increased to 250° C. where it was held for 1.5 hours after which the system was brought to atmospheric pressure with dry nitrogen and the reaction product was drained from the flask into a polytetrafluoroethylene pan and allowed to cool. The resulting polyester had a $T_g$ by DSC of 45° C. and a (melting point) $T_m$ of 170° C. The polyester had a theoretical sulfonate equivalent weight of 1350, and was soluble in hot (80° C.) water.

Synthesis of Sulfopolyester (Polymer D)

A one gallon polyester kettle was charged with 111.9 g (5.5 mole %) 5-sodiosulfoisophthalic acid, 592.1 g (47.0 mole %) terephthalic acid, 598.4 g (47.5 mole %) isophthalic acid, 705.8 g ethylene glycol, 59.9 g neopentyl glycol, 0.7 g antimony oxide, and 2.5 g sodium acetate. The mixture was heated with stirring to 230° C. at 345 kPa (50 psi) under nitrogen for 2 hours, during which time water evolution was observed. The temperature was increased to 250° C. and the pressure was then reduced, vacuum was applied (0.2 torr), and the temperature was increased to 270° C. The viscosity of the material increased over a period of 45 minutes, after which time a high molecular weight, clear, viscous sulfopolyester was drained. This sulfopolyester was found by DSC to have a $T_g$ of 70.3° C. The theoretical sulfonate equivalent weight was 3847 g polymer per mole of sulfonate. 500 g of the polymer was dissolved in a mixture of 2000 g water and 450 g isopropanol at 80° C. The temperature was then raised to 95° C. in order to remove the isopropanol (and a portion of the water), yielding a 22% solids aqueous dispersion.

Synthesis of Sulfopolyester (Polymer E)

A sulfopolyester was synthesized according to the procedure described above for Sulfopolyester D, except that different proportions of reactants were used in order to obtain a polymer with fewer sulfonate equivalents: 320.6 g (14 mole %) 5-sodiosulfoisophthalic acid, 609.9 g (43.0 mole %) terephthalic acid, 609.9 g (43.0 mole %) isophthalic acid, 1059.6 g ethylene glycol, 0.8 g antimony oxide, and 6.4 g sodium acetate. This sulfopolyester was found by DSC to have a $T_g$ of 74.8° C. The theoretical sulfonate equivalent weight was 1473 g polymer per mole of sulfonate. 500 g of the polymer was dissolved in 2000 g of water at 95° C., yielding a 20 % solids aqueous dispersion.

Synthesis of Sulfopolyester Polyol (Polymer F)

A sulfopolyester polyol was prepared generally following the procedure in Example 1 of U.S. Pat. No. 4,746,717.

A one liter 3-neck flask was equipped with a mechanical stirrer, a nitrogen purge system, distillation head, and receiving flask, and set for vacuum distillation. The receiving flask was cooled using a dry ice/acetone bath. A Woods metal bath was used to heat the 3 neck flask. Into the 3-neck flask was placed 296 grams (1 mole) dimethyl 5-sodiosulfoisophthalate, 1060 grams polycaprolactonediol (2 moles; PCP-0200, having an average molecular weight of 530) and 0.13 g tetraisopropyl titanate as esterification catalyst. Nitrogen purge and agitation were initiated. The contents of the flask were brought to 230° C. and held for 4 hours during which time 50 to 75 percent of the methanol condensate was removed. The pressure was reduced to 20 Torr and held for two hours. The system was then back filled with nitrogen and the low viscosity product removed from the flask while hot. This polyol was found to have a hydroxyl equivalent weight of 840 grams of polymer per mole of OH.

Synthesis of Sulfopolyurethane (Polymer G)

An 8 liter 3-neck flask was fitted with a mechanical stirrer, nitrogen purge system, addition funnel, distillation head and receiver. An oil bath heater and controller were used to heat the flask. The flask was charged with 830 g (0.5 moles) Sulfopolyester Polyol (Polymer F), prepared as described above, 720 g cyclohexanedimethanol (2.5 moles), and 2 liters of dry methyl ethyl ketone. The oil bath temperature was raised to 100° C., and 300 ml of methyl ethyl ketone (MEK) was distilled from the charge in order to remove azeotropically any water which may have been present. The temperature was reduced to 70° C., at which time 522 g (3.0 moles) toluene diisocyanate was charged into the addition funnel. Addition was begun at a rate which maintained a batch temperature between 70 and 80° C. When addition was completed (about 1.6 hours), 1.04 g (0.06 weight %) dibutyltin dilaurate was added to the reaction as a catalyst. Heating and stirring under a nitrogen purge was continued for 8 hours at which time 3.4 liters of water was added to the reaction and MEK was distilled off, resulting in a yield of a waterborne polyurethane of about 35% solids. This polymer had a 59° C. $T_g$ by DSC; cast films had a tensile strength at break of approximately 48,265 kPa (7000 psi) with an elongation at break of 300%.

Synthesis of Sulfopolyurethane (Polymer H)

The sulfopolyurethane was synthesized according to the procedure for Sulfopolyurethane (Polymer G). The following reaction charges were used:

| | | |
|---|---|---|
| sulfopolyester Polyol (Polymer F) | 830 g | 0.5 moles |
| PCP-0200 | 265 g | 0.5 moles |
| 2,2-diethyl-1,3-propanediol | 128 g | 1.0 moles |
| 2,4-toluenediisocyanate | 43.5 g | 2.5 moles |
| Total | 1266 g | |
| dibutyltin dilaurate | 0.76 g | 0.06 wt % |
| methyl ethyl ketone | 2.832 liters | |
| water | 2.532 liters | |

This reaction yielded a polymer with a $T_g$ by DSC of 24.2° C.

Synthesis of Photocurable Sulfoacrylate (Polymer J)

A 500 ml 3-neck flask was fitted with a mechanical stirrer, air purge system, addition funnel, distillation head and receiving flask. An oil bath heater and controller were used to control the temperature. The flask was charged with 207 grams (.025 moles) of Sulfopolyester Polyol (Polymer F) and 207 ml MEK. The flask was heated to 90° C. in order to remove azeotropically any water in the polymer. After about 50 ml MEK had been removed, the temperature was reduced to 60° C. and a polymerization inhibitor, p-methoxyphenol (about 0.02 grams, 0.01 weight percent of total charge), was added, and dry air was bubbled through the mixture. Then 38.75 grams (0.25 moles) of isocyanatoethylmethacrylate were added. Dibutyl tin dilaurate (0.06 weight percent of total charge) was added as a catalyst. The mixture was heated at 60° C. and stirred for about 2 hours. The contents of the flask were poured into 200 ml of deionized water and the temperature was maintained at 60° C.; while continuing to bubble air through the mixture, the pressure was reduced by aspirator to about 20 torr, and the MEK was distilled off. The resultant translucent, light yellow dispersion was stored in a brown glass container until needed for preparation of a coating.

Synthesis of Sulfopolyester (Polymer K)

A one gallon polyester kettle was charged with 126 g (6.2 mole %) dimethyl 5-sodiosulfoisophthalate, 625.5 g (46.8 mole %) dimethyl terephthalate, 628.3 g (47.0 mole %) dimethyl isophthalate, 854.4 g (200 mole % glycol excess) ethylene glycol, 365.2 g (10 mole %, 22 weight % in final polyester) PCP-0200™ polycaprolactone diol (Union Carbide), 0.7 g antimony oxide, and 2.5 g sodium acetate. The mixture was heated with stirring to 180° C. at 138 kPa (20 psi) under nitrogen, at which time 0.7 g zinc acetate was added. Methanol evolution was observed. The temperature was increased to 220° C. and held for 1 hour. The pressure was then reduced, vacuum applied (0.2 torr), and the temperature increased to 260° C. The viscosity of the material increased over a period of 30 minutes, after which time a high molecular weight, clear, viscous sulfopolyester was drained. This sulfopolyester was found by DSC to have a $T_g$ of 41.9° C. The theoretical sulfonate equivalent weight was 3954 g polymer per mole of sulfonate. 500 g of the polymer were dissolved in a mixture of 2000 g water and 450 g isopropanol at 80° C. The temperature was then raised to 95° C. in order to remove the isopropanol (and a portion of the water), yielding a 21% solids aqueous dispersion.

II. PREPARATION OF VANADIUM OXIDE

Vanadium oxide colloidal dispersions are prepared by the hydrolysis of a vanadium oxoalkoxide with a molar excess of deionized water. Preparations of dispersions are described in a co-pending application, U.S. Ser. No. 07/893,504). The following preparation was slightly preferred over others and was used in the preparation of the coating mixtures described here.

Vanadium oxide sol was prepared by adding vanadium triisobutoxide oxide (VO(O-iBu)$_3$) (15.8 g, 0.055 moles, Akzo Chemicals, Inc., Chicago, Ill.) to a rapidly stirring solution of hydrogen peroxide (1.56 g of 30% aqueous solution, 0.0138 moles, Mallinckrodt, Paris, Ky.) in deionized water (232.8 grams) at room temperature giving a solution with vanadium concentration equal to 22 moles/kg (2.0% V$_2$O$_5$). Upon addition of the vanadium isobutoxide, the mixture became dark brown and gelled within five minutes. With continued stirring, the dark brown gel broke up giving an inhomogeneous, viscous dark brown solution which was homogeneous in about 45 minutes. The sample was allowed to stir for 1.5 hours at room temperature. It was then transferred to a polyethylene bottle and aged in a constant temperature bath at 50° C. for 6 days to give a dark brown thixotropic gel.

The concentration of V(+4) in the gel was determined by titration with potassium permanganate to be 0.072 moles/kg. This corresponded to a mole fraction of V(+4) [i.e., V(+4)/ total vanadium] of 0.33.

The sol was then further mixed with deionized water to form desired concentrations before use in coating formulations.

III. PREPARATION OF COATING MIXTURES

General Procedure:

The vanadium oxide colloidal dispersion was diluted to a desired concentration by mixing with deionized water. This solution was mixed with an aqueous dispersion of the sulfopolymer and a small amount of surfactant. Addition of surfactant was preferred to improve the wetting properties of the coating. The mixture preferably was coated with a Mayer bar onto a substrate such as polyethyleneterephthalate in order to perform static decay measurements. It was generally preferred to treat the film substrate by flame treating, corona treating, or plasma treating, or to use a film which had been primed, as is well known in the art. The treating methods are known to generally improve wettability and coating adhesion. It was convenient to use a PVDC (polyvinylidene chloride) primed polyester (prepared as disclosed in U.S. Pat. No. 4,203,769, col. 15, lines 13–34) for coating out many of the dispersions to obtain static decay measurements.

The coated article was dried at 100° C. for a few minutes. The antistatic properties of the coated film were measured by determining the charge decay time of the coated sample; i.e., by applying voltage and measuring the time required for the charge to dissipate. This measurement was done on a Static Decay Meter (Model 406C, Electro-Tech Systems, Inc., Glenside, Pa.), wherein the voltage was applied at 5000 volts and the time for the charge to decay to less than 50 volts was measured. Static decay times of less than 1 second are optimum. Values up to 10 seconds or more can be useful.

In the Examples, all percents are by weight unless otherwise stated.

EXAMPLE 1

Vanadium Oxide Plus Sulfopolyester Dispersion

Vanadium oxide sol (0.75 g of 1% sol prepared as described above in Sec. II) was diluted with 9.04 g deionized water and then 0.21 g of 1.0% AQ55D™ sulfopolyester dispersion (product of Eastman Kodak Co., Kingsport, Tenn.) and 0.02 g 10% Triton X-100 (surfactant product of Rohm and Haas Corp., Philadelphia, Pa.) were added to give a homogeneous dark greenish brown solution containing 0.042% vanadium and 0.021% polymer and with weight ratio of vanadium:polymer=2:1. The solution was coated onto PVDC-primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table I. The appearance of the vanadium oxide plus sulfopolyester coating solutions and the static decay times of film samples coated with a No. 6 Mayer bar as described above are tabulated in Table I.

TABLE I

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 8.31 g | 4.56 g |
| 1.0% polymer dispersion | .21 g | 1.05 g | 5.25 g | | |
| 28.0% polymer dispersion | | | | 0.94 g | 4.69 g |
| appearance | A | A | A | B | C |
| static decay time (seconds) | 0.01 | 0.01 | 0.01 | 0.01 | * |
| percent total solids | 0.09 | 0.17 | 0.6 | 2.7 | 13.8 | where, in all Examples,
A = clear, dark greenish brown
B = greenish brown liquid plus separation of greenish black gelatinous clots
C = white or light brown liquid plus separation of greenish black gelatinous clots
* = dispersion of poor quality, no coating could be made The data of Table I show that the coatings of the present invention provide excellent antistatic properties.

EXAMPLE 2

Vanadium Oxide Plus Sulfopolyester Dispersion

Vanadium oxide sol (0.75 g of 1% sol, prepared as described in Example 1) was diluted with 9.04 g deionized water and then 0.21 g of 1.0% AQ29D™ sulfopolyester dispersion (product of Eastman Kodak Co., Kingsport, Tenn.) and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table II. The appearance of the vanadium oxide plus sulfopolyester coating solutions and the static decay times of film samples coated with a No. 6 Mayer bar as described above are tabulated in Table II.

TABLE II

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 8.37 g | 4.87 g |
| 1.0% polymer dispersion | .21 g | 1.05 g | 5.25 g | | |
| 30.0% polymer dispersion | | | | 0.88 g | 4.38 g |
| appearance | A | A | A | B | C |
| static decay time (seconds) | 0.01 | 0.01 | 0.01 | 0.01 | * |
| percent total solids | 0.096 | 0.17 | 0.6 | 2.7 | 13.2 |

The data of Table II show that the coatings of the present invention provide excellent antistatic properties.

EXAMPLE 3

Vanadium Oxide Plus Sulfopolyester Polymer A Dispersion

Vanadium oxide sol (0.75 g of 1% sol prepared as described in Example 1) was diluted with 9.04 g deionized water and then 0.21 g of 1.0% sulfopolyester Polymer A aqueous dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table III. The appearance of the vanadium oxide plus sulfopolyester coating solutions and the static decay times of film samples coated with a No. 6 Mayer bar as described above are tabulated in Table III.

TABLE III

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 8.00 g | 3.00 g |
| 1.0% polymer dispersion | 0.21 g | 1.05 g | 5.25 g | | |
| 21.0% polymer dispersion | | | | 1.25 g | 6.25 g |
| appearance | A | A | A | A | B |
| static decay time (seconds) | 0.01 | 0.01 | 0.01 | 0.01 | 0.01 |
| percent total solids | 0.096 | 0.17 | 0.6 | 2.7 | 13.2 |

The data of Table III show the outstanding antistatic coatings by the dispersions of the present invention.

EXAMPLE 4

Vanadium Oxide Plus Sulfopolyester Polymer B Dispersion

Vanadium oxide sol (0.75 g of 1% sol prepared as described in Example 1) was diluted with 9.04 g deionized water and then 0.21 g of 1.0% sulfopolyester (Polymer B) aqueous dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table IV. The appearance of the vanadium oxide plus sulfopolyester coating solutions and the static decay times of film samples coated with a No. 6 Mayer bar as described above are tabulated in Table IV.

TABLE IV

| V:polymer weight ratio | 2:1 | 2:5 | 2:25 | 2:125 | 2:625 |
| --- | --- | --- | --- | --- | --- |
| 1.0% vanadium oxide sol | 0.75 g | 0.75 g | 0.75 g | 0.75 g | 0.75 g |
| deionized water | 9.04 g | 8.20 g | 4.00 g | 7.94 g | 2.69 g |
| 1.0% polymer dispersion | 0.21 g | 1.05 g | 5.25 g | | |
| 21.0% polymer dispersion | | | | 1.31 g | 6.56 g |
| appearance | A | A | A | D | E |
| static decay time (seconds) | 0.01 | 0.01 | 0.01 | 0.01 | 0.02 |
| percent total solids | 0.096 | 0.17 | 0.6 | 2.8 | 13.8 | where D = greenish brown, slightly hazy solution
E = green, hazy solution

The data of Table IV show the outstanding antistatic coatings provided by the dispersions of the present invention.

EXAMPLE 5

Vanadium Oxide Plus Sulfopolyester Polymer D Dispersion

Vanadium oxide sol (0.75 g of 1% sol prepared as described in Example 1) was diluted with 9.04 g deionized water and then 0.21 g of 1.0% sulfopolyester Polymer D dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table V. The appearance of the vanadium oxide plus sulfopolyester coating solutions and the static decay times of film samples coated with a No. 6 Mayer bar as described above are tabulated in Table V.

TABLE V

| V:polymer weight ratio | 2:1 | 2:5 | 2:25 | 2:125 | 2:625 |
| --- | --- | --- | --- | --- | --- |
| 1.0% vanadium oxide sol | 0.75 g | 0.75 g | 0.75 g | 0.75 g | 0.75 g |
| deionized water | 9.04 g | 8.20 g | 4.00 g | 8.00 g | 3.00 g |
| 1.0% polymer dispersion | 0.21 g | 1.05 g | 5.25 g | | |
| 20.0% polymer dispersion | | | | 1.25 g | 6.25 g |
| appearance | A | A | A | A | B |
| static decay time (seconds) | 0.01 | 0.01 | 0.01 | 0.01 | 0.04 |
| percent total solids | 0.096 | 0.17 | 0.6 | 2.6 | 12.5 |

The data of Table V show the outstanding antistatic coatings provided by dispersions of the present invention.

EXAMPLE 6

Vanadium Oxide Plus Sulfopolyester (Polymer E) Dispersion

Vanadium oxide sol (0.75 g of 1% sol prepared as described in Example 1) was diluted with 9.04 g deionized water and then 0.21 g of 1.0% Polymer E sulfopolyester aqueous dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table VI. The appearance of the vanadium oxide plus sulfopolyester coating solutions and the static decay times of film samples coated with a No. 6 Mayer bar as described above are tabulated in Table VI.

TABLE VI

| V:polymer weight ratio | 2:1 | 2:5 | 2:25 | 2:125 | 2:625 |
| --- | --- | --- | --- | --- | --- |
| 1.0% vanadium oxide sol | 0.75 g | 0.75 g | 0.75 g | 0.75 g | 0.75 g |
| deionized water | 9.04 g | 8.20 g | 4.00 g | 7.94 g | 2.69 g |
| 1.0% polymer dispersion | 0.21 g | 1.05 g | 5.25 g | | |
| 20.0% polymer dispersion | | | | 1.31 g | 6.56 g |
| appearance | A | A | A | A. | C |
| static decay time (seconds) | 0.01 | 0.01 | 0.01 | 0.01 | * |
| percent total solids | 0.096 | 0.17 | 0.6 | 2.7 | 13.2 |

EXAMPLE 7

Vanadium Oxide Plus Sulfopolyester (Polymer C) Dispersion

Vanadium oxide sol (0.75 g of 1% sol prepared as described in Example 1, above) was diluted with 9.04 g deionized water and then 0.21 g of 1.0% sulfopolyester Polymer C aqueous dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table VII. The appearance of the vanadium oxide plus sulfopolyester coating solutions and the static decay times of film samples coated with a No. 6 Mayer bar as described above are tabulated in Table VII.

TABLE VII

| V:polymer weight ratio | 2:1 | 2:5 | 2:25 | 2:125 | 2:625 |
| --- | --- | --- | --- | --- | --- |
| 1.0% vanadium oxide sol | 0.75 g | 0.75 g | 0.75 g | 0.75 g | 0.75 g |
| deionized water | 9.04 g | 8.20 g | 4.00 g | 7.50 g | 0.50 g |
| 1.0% polymer dispersion | 0.21 g | 1.05 g | 5.25 g | | |
| 15.0% polymer dispersion | | | | 1.75 g | 8.75 g |
| appearance | A | A | A | B | C |
| static decay time (seconds) | 0.01 | 0.01 | 0.01 | 0.01 | * |
| percent total solids | 0.096 | 0.17 | 0.6 | 2.7 | 13.2 |

EXAMPLE 8

Vanadium Oxide Plus Sulfopolyurethane (Polymer H) Dispersion

Vanadium oxide sol (0.75 g of 1% sol prepared as described in Example 1, above) was diluted with 9.04 g deionized water and then 0.21 g of 1.0% sulfopolyurethane (Polymer H) aqueous dispersion and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyurethane dispersion as shown in Table VIII. The appearance of the vanadium oxide plus sulfopolyurethane coating solutions and the static decay times of film samples coated with a No. 6 Mayer bar as described above are tabulated in Table VIII.

TABLE VIII

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 8.16 g | 3.78 g |
| 1.0% polymer dispersion | 0.21 g | 1.05 g | 5.25 g | | |
| 24.0% polymer dispersion | | | | 1.09 g | 5.47 g |
| appearance | A | A | A | B | C |
| static decay time (seconds) | 0.01 | 0.01 | 0.01 | 0.01 | * |
| percent total solids | 0.096 | 0.17 | 0.6 | 2.7 | 13.2 |

EXAMPLE 9

Vanadium Oxide Plus Sulfopolyurethane (Polymer G) Dispersion

Vanadium oxide sol (0.75 g of 1% sol prepared as described in Example 1, above) was diluted with 9.04 g deionized water and then 0.21 g of 1.0% sulfopolyurethane (Polymer G) aqueous dispersion and 0.02 g 10% Triton X-100 surfactant were added to give a homogeneous dark greenish brown solution containing 0.042% vanadium and 0.021% polymer and with weight ratio of vanadium oxide:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyurethane dispersion as shown in Table IX. The appearance of the vanadium oxide plus sulfopolyurethane coating solutions and the static decay times of film samples coated with a No. 6 Mayer bar as described above are tabulated in Table IX.

TABLE IX

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 8.20 g | 4.00 g |
| 1.0% polymer dispersion | 0.21 g | 1.05 g | 5.25 g | | |
| 25.0% polymer dispersion | | | | 1.05 g | 5.25 g |
| appearance | A | A | A | A | B |
| static decay time (seconds) | 0.01 | 0.01 | 0.01 | 0.01 | 0.17 |
| percent total solids | 0.096 | 0.17 | 0.6 | 2.7 | 13.2 |

Data of Table IX show that coatings prepared from dispersion of the present invention, particularly for low to moderate amounts of polymer, provided excellent antistatic coatings.

EXAMPLE 10

Vanadium Oxide Plus 2000MW Poly(sodiumstyrenesulfonate) Solution

Vanadium oxide sol (0.75 g of 1% sol prepared as described in Example 1, above) was diluted with 9.04 g deionized water and then 0.21 g of 1.0% 2000MW poly(sodiumstyrenesulfonate) (product of Polysciences, Inc. Warrington Pa.) aqueous solution (deionized water) and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of poly(sodiumstyrenesulfonate) as shown in Table X. The appearance of the vanadium oxide plus poly(sodiumstyrenesulfonate) coating solutions and the static decay times of film samples coated with a No. 6 Mayer bar as described above are tabulated in Table X.

TABLE X

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 7.94 g | 2.69 g |
| 1.0% polymer dispersion | 0.21 g | 1.05 g | 5.25 g | | |
| 20.0% polymer dispersion | | | | 1.31 g | 6.56 g |
| appearance | A | A | A | C | C |
| static decay time (seconds) | 0.01 | 0.01 | 0.02 | * | * |
| percent total solids | 0.96 | 0.18 | 0.6 | 2.7 | 13.2 |

EXAMPLE 11

Vanadium Oxide Plus 500,000MW Poly(sodiumstyrenesulfonate) Solution

Vanadium oxide sol (0.75 g of 1% sol prepared as described in Example 1, above) was diluted with 9.04 g deionized water and then 0.21 g of 1.0% 500,000MW poly(sodiumstyrenesulfonate) (product of Scientific Polymer Products, Inc., Ontario N.Y.) solution and 0.02 g 10% Triton X-100 surfactant were added to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of poly(sodiumstyrenesulfonate) as shown in Table XI. The appearance of the vanadium oxide plus poly(sodiumstyrenesulfonate) coating solutions and the static decay times of film samples coated with a No. 6 Mayer bar as described above are tabulated in Table XI.

TABLE XI

| V:polymer weight ratio | 2:1 | 2:5 | 2:25 | 2:125 | 2:625 |
|---|---|---|---|---|---|
| 1.0% vanadium oxide sol | 0.75 g | 0.75 g | 0.75 g | 0.75 g | 0.75 g |
| deionized water | 9.04 g | 8.20 g | 4.00 g | 7.94 g | 2.69 g |
| 1.0% polymer dispersion | 0.21 g | 1.05 g | 5.25 g | | |
| 20.0% polymer dispersion | | | | 1.31 g | 6.56 g |
| appearance | A | A | A | C | C |
| static decay time (seconds) | 0.01 | 0.01 | 0.02 | 1.09 | * |
| percent total solids | 0.96 | 0.17 | 0.6 | 2.7 | 13.2 |

EXAMPLE 12

Vanadium Oxide Sol Prepared by Quenching Molten $V_2O_5$ (according to U.S. Pat. No. 4,203,769) Plus Sulfopolyester (Polymer A) Dispersion $V_2O_5$ (15.6 g, 0.086mol, product of Aldrich, Milwaukee, Wis.) was heated in a covered platinum crucible for 10 minutes at 1100° C. and then poured into 487 g of rapidly stirring deionized water. The resulting liquid plus gelatinous black precipitate was warmed to 40°–45° C. for 10 minutes to give a soft, thixotropic black gel which was diluted with deionized $H_2O$ and was filtered to give a 2.0% $V_2O_5$ sol containing 1.1% vanadium. Vanadium oxide sol thus prepared (0.38 g) was diluted with 9.41 g deionized water and then 0.21 g of 1.0% sulfopolyester Polymer A aqueous dispersion and 0.02 g 10% Triton X-100 surfactant were added at room temperature to give a homogeneous dark greenish brown solution containing 0.042% vanadium and 0.021% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table XII. The appearance of the vanadium oxide plus sulfopolyester coating solutions and the static decay times of film samples coated with a No. 6 Mayer bar as described above are tabulated in Table XII.

TABLE XII

| V:polymer weight ratio | 2:1 | 2:5 | 2:25 | 2:125 | 2:625 |
|---|---|---|---|---|---|
| 2.0% vanadium oxide sol | 0.38 g | 0.38 g | 0.38 g | 0.38 g | 0.38 g |
| deionized water | 9.41 g | 8.58 g | 4.38 g | 8.37 g | 3.37 g |
| 1.0% polymer dispersion | 0.21 g | 1.05 g | 5.25 g | | |
| 21.0% polymer dispersion | | | | 1.25 g | 6.25 g |
| appearance | A | A | A | A | A |
| static decay time (seconds) | 0.01 | 0.01 | 0.01 | 0.01 | 0.01 |
| percent total solids | 0.097 | 0.18 | 5.3 | 2.7 | 13.2 |

EXAMPLE 13

Vanadium Oxide Sol Prepared by Ion-Exchange Acidification of $NaVO_3$ Plus Sulfopolyester (Polymer A) Dispersion $NaVO_3$ (6.0 g, 0.049mol, product of Alfa Products, Ward Hill, Mass.) was dissolved by warming in 144 g deionized $H_2O$ and the resulting solution was filtered to remove insoluble material. The filtered solution was pumped through a 15 mm× 600 mm chromatography column containing 600 mL of ion exchange resin Amberlite™ IR 120 Plus ($H^+$) (Rohm & Haas, Philadelphia, Pa.) to give a light orange solution containing 3.0% $V_2O_5$, i.e., 1.7% vanadium. The solution became a soft opaque brick red gel upon standing at room temperature for 24 hr. Vanadium oxide sol thus prepared (1.25 g) was diluted with 7.70 g deionized water and then 1.05 g of 1.0% sulfopolyester (Polymer A) dispersion and 0.02 g 10% Triton X-100 surfactant were added to give a homogeneous dark greenish brown solution containing 0.21% vanadium and 0.105% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table XIII. The appearance of the vanadium oxide plus sulfopolyester coating solutions and the static decay times of film samples coated with a No. 6 Mayer bar as described above are tabulated in Table XIII.

TABLE XIII

| V:polymer weight ratio | 2:1 | 2:5 | 2:25 | 2:125 |
|---|---|---|---|---|
| 3.0% vanadium oxide sol | 1.25 g | 1.25 g | 1.25 g | 1.25 g |
| deionized water | 7.70 g | 3.50 g | 7.50 g | 2.50 g |
| 1.0% polymer dispersion | 1.05 g | 5.25 g | | |
| 21.0% polymer dispersion | | | 1.25 g | 6.25 g |
| appearance | A | A | A | A |
| static decay time (seconds) | 0.01 | 0.01 | 0.04 | 0.03 |
| percent total solids | 0.48 | 0.9 | 3.0 | 13.5 |

Example 14

Vanadium Oxide Sol Prepared by Reaction of $V2O_5$ with $H_2O_2$ Plus Sulfopolyester (Polymer A) Dispersion Hydrogen peroxide (20.0 g of a 30% solution, 0.176mol) was added to crystalline $V_2O_5$ (2.00 g, 0.011 mol, product of Aldrich Chemical Co., Milwaukee, Wis. and used as received) suspended in 78.1 g of rapidly stirring deionized water. A vigorous reaction ensued with the evolution of a gas and warming of the reaction mixture. After stirring overnight at room temperature the product was a hazy, orange brown colloidal dispersion containing 2.0% $V_2O_5$. Vanadium oxide sol thus prepared (1.88 g) was diluted with 7.07 g deionized water and then 1.05 g of 1.0% sulfopolyester (Polymer A) aqueous dispersion and 0.02 g 10% Triton™ X-100 surfactant were added to give a homogeneous dark greenish brown solution containing 0.21% vanadium and 0.105% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table XIV. The appearance of the vanadium oxide plus sulfopolyester coating solutions and the static decay times of film samples coated with a No. 6 Mayer bar as described above are tabulated in Table XIV.

TABLE XIV

| V:polymer weight ratio | 2:1 | 2:5 | 2:25 | 2:125 |
|---|---|---|---|---|
| 2.0% vanadium oxide sol | 1.88 g | 1.88 g | 1.88 g | 1.88 g |
| deionized water | 7.07 g | 2.87 g | 6.87 g | 1.87 g |
| 1.0% polymer dispersion | 1.05 g | 5.25 g | | |
| 21.0% polymer dispersion | | | 1.25 g | 6.25 g |
| appearance | A | A | A | A |
| static decay time (seconds) | 0.01 | 0.01 | 0.03 | 0.10 |
| percent total solids | 0.48 | 0.9 | 3.0 | 13.1 |

EXAMPLE 15

Vanadium Oxide Sol Prepared by Hydrolysis of $VO_2OAc$ Plus Sulfopolyester (Polymer A) Dispersion Vanadium dioxide acetate, $VO_2OAc$ (0.50 g, 3.5 mmol, prepared as described in Preuss, F.; Woitschach, J.; Schug, H. *J. Inorg. Nucl. Chem.*, 1973, 35, 3723–30) was added to a rapidly stirring solution of 0.10 g 30% $H_2O_2$ plus 0.79 g isobutanol (10.7 mmol, product of Aldrich Chemical Co., Milwaukee, Wis.) plus 14.6 g deionized water to give a clear, reddish brown solution. The solution was allowed to age at room temperature for 14 days to give a dark brown, weakly gelled colloidal dispersion of 2% $V_2O_5$. Vanadium oxide sol thus prepared (0.75 g) was diluted with 8.83 g deionized water and then 0.42 g of 1.0% sulfopolyester (Polymer A) aqueous dispersion and 0.02 g 10% Triton X-100 surfactant were added to give a homogeneous dark greenish brown solution containing 0.084% vanadium and 0.0402% polymer and with weight ratio of vanadium:polymer=2:1. The solution was coated onto PVDC primed polyester by hand draw down using a No. 6 Mayer bar and dried at 120° C. for 1 minute. The static decay time of the coated film was 0.01 seconds. The procedure was repeated using greater amounts of sulfopolyester dispersion as shown in Table XV. The appearance of the vanadium oxide plus sulfopolyester coating solutions and the static decay times of film samples coated with a No. 6 Mayer bar as described above are tabulated in Table XV.

TABLE XV

| V:polymer weight ratio | 2:1 | 2:5 | 2:25 | 2:125 |
|---|---|---|---|---|
| 2.0% vanadium oxide sol | 0.75 g | 0.75 g | 0.75 g | 0.75 g |
| deionized water | 8.83 g | 7.15 g | 8.75 g | 6.75 g |
| 1.0% polymer dispersion | 0.42 g | 2.10 g | | |
| 21.0% polymer dispersion | | | 0.50 g | 2.50 g |
| appearance | A | A | A | A |
| static decay time (seconds) | 0.01 | 0.01 | 0.01 | 0.02 |
| percent total solids | 0.19 | 0.36 | 1.2 | 5.4 |

EXAMPLE 16

Determination of $[V]_{eff}$ in a Polymer A Coating of Constant Coating Weight

Polymer A (2.86 g of a 21% dispersion), deionized water (4.15 g) and Triton X-100 surfactant (0.05 g of a 10% solution) were added to 3.00 g of vanadium oxide colloidal dispersion containing 0.56% vanadium, prepared as described above in Sec. II, above, to give a homogeneous dark greenish brown solution containing 0.17% vanadium and 6.0% polymer with weight ratio vanadium:polymer= 2:72. The solution was coated onto PVDC primed polyester by hand draw down using a No. 3 Mayer bar and dried at 120° C. for 1 minute to give a coating with a calculated vanadium surface concentration=11.6 mg/m². The static decay time of the coated film was 0.01 seconds. The procedure was repeated using lesser amounts of vanadium oxide colloidal dispersion as shown in Table XVI. The calculated vanadium surface concentration and the static decay times of films coated using a No. 3 Mayer bar are tabulated in Table XVI. From these data, $[V]_{eff}$, the surface concentration of vanadium required to give static decay times less than 0.10 sec, was determined to be 2.9 mg/m². A coating (comparative) prepared by handspreading (No. 3 Mayer bar) a solution of 6.0% Polymer A plus 0.05% Triton X-100 surfactant and drying at 100° C. for five minutes did not exhibit static decay.

TABLE XVI

| vanadium concentration | 0.170% | 0.084% | 0.042% | 0.021% | 0.011% |
|---|---|---|---|---|---|
| 1.0% vanadium oxide sol | 3.00 g | 1.50 g | 0.75 g | 0.38 g | 0.19 g |
| deionized water | 4.15 g | 5.65 g | 6.40 g | 6.78 g | 6.97 g |
| 21.0% polymer solution | 2.86 g | 2.86 g | 2.86 g | 2.86 g | 2.86 g |
| 10.0% Triton X-100 | 0.05 g | 0.05 g | 0.05 g | 0.05 g | 0.05 g |
| vanadium surface concentration, [V], mg/m² | 11.5 | 5.8 | 2.9 | 1.4 | 0.72 |
| static decay time, sec | 0.01 | 0.03 | 0.06 | 1.8 | 15.0 |
| percent total solids | 6.3 | 6.1 | 6.1 | 6.0 | 6.0 |

EXAMPLE 17

Preparation of Photocurable Sulfoacrylate $V_2O_5$

Deionized water (16.3 g), sulfodiacrylate polymer dispersion (0.95 g of a 62% dispersion, Polymer J), Triton X-100 surfactant (0.10 g of a 10% aqueous solution), and N,N'azobis(cyanovaleric acid) (1.20 g of a 2% aqueous solution, product of Wako Chemical USA, Dallas Tex.) were added to 1.50 g of a vanadium oxide colloidal dispersion containing 0.56% vanadium and prepared as described above in Section II. The resulting dispersion was coated onto PVDC primed polyester film using a No. 36 Mayer bar and dried at 120° C. for 5 minutes. The coating was cured in nitrogen in an RPC Processor Model No. QC1202ANIR (from PPG, Inc., Pittsburgh, Pa.) at 30cm/sec with two standard medium pressure mercury lamps operating at 120 watts/cm. The lamps were located approximately 9.5 cm from the film. The static decay time for the cured coating was 0.02 seconds.

EXAMPLE 18

Preparation of a polyethyleneterephthalate film coated with Sulfopolyester and Vanadium Oxide for a low friction coating A 5% by weight dispersion of ethylenetetrafluoroethylene copolymer beads (Polyfluo™ 400, Micro Powders, Inc., Scarsdale, N.Y.) was prepared by combining 2.5 grams of the beads with 5 grams of 10% aqueous solution of Triton X-100 surfactant and 42.5 grams of deionized water. The mixture was placed into a glass jar with several 0.6 cm glass beads and roll milled for 24 hours to insure complete mixing. The mixture was also vigorously shaken before use. PET film (0.1 millimeter) was prepared for use in this experiment by surface treatment with a commercial flame treater.

A coating mixture was prepared by combining 0.20 grams of a 1% vanadium oxide dispersion while stirring with 16.57 grams deionized water, 5.95 grams of a 22 percent by weight solids dispersion of sulfopolyester (Polymer D), 1.70 grams of a 22 percent by weight solids dispersion of sulfopolyester (Polymer A), 0.30 grams of a 10% by weight aqueous solution of Triton X-100 surfactant, and 0.28 grams of 5% bead dispersion as described above.

The mixture was coated sequentially onto both sides of a 20.3 cm×30.5 cm sheet of flame-treated 0.1 millimeter thick PET film by drawdown with a #6 wire-wound rod, and each side was dried for 1 minute at 130° C. The resulting sample was clear. Static decay time was 0.45 seconds. The average kinetic coefficient of friction was 0.26. The sample was imaged in a plain paper copier (Xerox™ brand 1038) and tested for adhesion of the fused toner image by rubbing across a 2.5 cm×7.6 cm toned image rapidly and firmly with the smooth edge of a coin. None of the toned image was removed.

A second identical sample was prepared except that the vanadium oxide dispersion was excluded. The friction and adhesion results were the same, but in the static decay measurement, there was a residual charge of 2000 V on the surface. This shows that an antistatic property is added to the other required properties of the coating without any deleterious effects.

EXAMPLE 19

Brushes coated with Sulfopolyester and Vanadium Oxide

A nylon brush (product #520B, having the trade designation BRUSHLON™, 3M Co., St. Paul, Minn.) was treated with a mixture of sulfopolyester dispersion, prepared as described above (Polymer C), and vanadium oxide dispersion as directed in Section II, above. In this brush construction, bristles are uniformly embedded in polyurethane, and project from the surface about 2.2 cm.

The mixture was prepared as follows: 75 grams of 1% vanadium oxide dispersion was mixed with 672 grams of deionized water. 238 grams of a 21% solids solution of sulfopolyester was added with stirring, and then 15 grams of a 10% aqueous solution of Triton X-100 surfactant was added.

A 10.2 cm×15.2 cm sample of the brush was dipped into the mixture. The sample was allowed to drain, and all excess liquid was removed by vigorously shaking the sample for 5 seconds. The sample was placed in a 50° C. counterflow oven for 2 hours, then cooled to room temperature. The bristles were rubbed over a counter edge for 30 seconds to remove any nonadhering coating material.

The sample was tested for static decay time on the back side as well as on the bristle side. The charge decay times were: back side: 0.01 seconds; bristle side: 0.78 seconds. The treated sample was washed under running water for 1 minute, dried as described above, and retested. The decay times were: back side, 0.03 seconds; bristle side, 2.76 seconds. A similar sample which had not been treated was also tested. The decay times were: back side, 1.09 seconds; bristle side, a static charge could not be established.

These results indicated that an antistatic coating had been applied to both the back and bristle sides of the treated sample, and that the coating was water resistant and adequately adhered to the sample.

EXAMPLE 20

Various films coated with Sulfopolyester and Vanadium Oxide

A coating solution was prepared by adding 22.0 grams deionized water, 2.0 grams diacetone alcohol, 0.40 grams of 10% Triton X-100, and 1.5 grams of a 21% aqueous dispersion of the sulfopolyester (Polymer A) prepared as described above to a 4.5 gram vanadium oxide colloidal dispersion (as in Section II, above) (total V concentration= 0.56%, i.e., 1% $V_2O_5$). The weight ratio of vanadium: polymer in the coating solution was 2:25. The coating solution was applied to polyimide film (Kapton™ film, available from E. I. DuPont de Nemours Inc., Wilmington, Del.), polymethylmethacrylate sheet (Plexiglas™ G Acrylic Safety Glazing, available from Rohm and Haas Canada, Inc., West Hill, Ontario), polycarbonate sheet (Lexan™, available from General Electric, Cleveland, Ohio), cellulose triacetate (available from 3M Co., St. Paul, Minn.), and paper (Type 696™ White Bond Paper, available from 3M Co., St. Paul, Minn.) using a No. 3 Mayer bar and dried at 100° C. for 5 minutes. The static decay rates of the coated samples were:

polyimide: 0.01 seconds polymethylmethacrylate: 0.01 seconds polycarbonate: 0.01 seconds cellulose triacetate: 0.02 seconds paper: 0.01 seconds.

None of the uncoated samples exhibited static decay except for the paper. The static decay rate of the uncoated paper was 20 seconds.

EXAMPLE 21

Antistatic backside coat for magnetic media

A sheet of PET film (12 micrometers thick), having on one side a cobalt/nickel coating as is suitable for magnetic media (prepared by vacuum deposition, as is known in the art) to provide a magnetic tape, was tested for its static decay properties before treatment with a sulfopolymer. Surface resistivity values were: Co—Ni side, $1.3 \times 10^{11}$ ohms/sq; PET side, $8.9 \times 10^{16}$ ohms/sq. Charge decay values were: Co—Ni side: 0.01 seconds; PET side, free charge of 250 volts before charging.

A mixture of vanadium oxide colloidal dispersion and sulfopolymer was prepared as follows: 400 grams of 1% vanadium oxide dispersion was combined with 56 grams of 18% by weight aqueous dispersion of sulfopolyester (Polymer K) prepared as described above, 524 grams of deionized water, and 20 grams of a 10% aqueous dispersion of Triton X-100. This mixture was applied to the back side of the sheet of magnetic media by gravure coating to obtain a dry coating thickness of about 1 micrometer. The coated sample was dried in an oven at about 90° C. for 20 seconds. A 8.9 cm×15.2 cm sample of this coated material was tested for its static decay properties. Surface resistivity and charge decay values for the Co—Ni coated side were very similar to those of the sample with no backside treatment. For the vanadium oxide/sulfopolyester coated side, surface resistivity was $2 \times 10^8$ ohms/sq; charge decay time was 0.01 seconds. This demonstrated that the vanadium oxide/sulfopolymer coating effectively protected the backside of the magnetic media from build-up of static charge. It is useful to compare this to a magnetic tape coated with a conventional carbon dispersion treatment on the backside: with this treatment, the tape had a surface resistivity of $3.3 \times 10^8$ ohms/square and a charge decay time of 0.01 seconds. This indicates that the vanadium oxide-sulfopolymer compares favorably with conventional backside treatments.

Example 22

Carpet coated with Sulfopolyester and Vanadium Oxide

This example demonstrates the preparation of antistatic carpet samples. A solution containing vanadium oxide colloidal dispersion (0.084% vanadium, 0.15% $V_2O_5$), 0.10%

Triton X-100 surfactant, and 6.0% sulfopolyester (Polymer K) was applied to the backside of polypropylene carpet and nylon carpet.

The carpet was a level loop construction (as is known in the art) and was produced using polypropylene (product number 323, from Himont USA, Inc.) for one sample and nylon (Nylon 6, brand Ultramid B from BASF Corp.) for another. The carpet was produced from the polymer fibers for this example rather than commercially obtained, in order to avoid other surface treatments on the carpet, such as fluorochemicals, used for stain resistance.

Approximately 0.05 grams of coating solution was applied per square centimeter of carpet. A foam applicator was used to apply the dispersion to the carpet. Application in this manner, however, renders some portions of the carpet lightly treated or perhaps untreated. Therefore, rapid charge decay was observed, but some residual charge tended to decay slowly or not at all.

Each sample was dried at 100° C. for 1 hour to produce samples which had the following static decay times:

| Polypropylene | (backside) | 0.30 sec | (5000 to 50 V) |
| --- | --- | --- | --- |
| | | 0.01 sec | (5000 to 500 V) |
| | (frontside) | 2.20 sec | (5000 to 500 V) |
| Nylon | (backside) | 0.57 sec | (5000 to 50 V) |
| | | 0.01 sec | (5000 to 500 V) |
| | (frontside) | 0.01 sec | (5000 to 500 V) |

Untreated carpet samples did not exhibit static decay.

EXAMPLE 23

Vanadium Oxide Layer Under Sulfopolyester Layer

Vanadium oxide colloidal dispersion containing 0.084% vanadium prepared as described above in Sec. II and containing 0.10% Triton X-100 surfactant was coated onto PVDC primed polyester film by hand draw down using a No. 3 Mayer bar and dried at 100° C. for five minutes. The coated film was then overcoated with a solution containing 6.0% Polymer A plus 0.05% Triton X-100 surfactant and dried at 100° C. for five minutes. The resulting film had static decay time=0.01 seconds when measured in the draw down direction.

EXAMPLE 24

Vanadium Oxide Layer Over Sulfopolyester Layer

A coating solution containing 6.0% Polymer A plus 0.05% Triton X-100 surfactant was coated onto PVDC primed polyester film using a No. 3 Mayer bar and dried at 100° C. for five minutes. The coated film was then overcoated with a colloidal solution of vanadium oxide containing 0.084% vanadium, prepared as described in Sec. II above using a No. 3 Mayer bar and dried at 100° C. for five minutes. The resulting film had static decay time=0.01 seconds.

EXAMPLE 25

Antistatic non-woven polymer mat

A coating solution of a sulfopolymer and vanadium oxide dispersion was prepared as follows:

100 grams of 1% vanadium oxide sol prepared as in Sec. II above, was combined with 336 grams deionized water, 54 grams of 18.5% solution of Polymer K, and 10 grams of 10% Triton X-100 surfactant in water. Next, a 30.5 cm×30.5 cm mat of nonwoven polypropylene fiber mat (46.4 grams/meter [1.5 oz/yard] of CELESTRA™, a trade designation of Fiberweb North America, Inc., Greenville, S.C., was folded into a 3.8 cm sq and dipped into the coating mixture. The nonwoven sample was squeezed until it did not effuse any more liquid; then it was unfolded and placed in a 50° C. counterflow oven for 5 minutes. A 8.9 cm×15.2 cm test strip was cut from the coated sample and tested for charge decay. The charge decay time was 0.01 seconds. A similar, uncoated comparative test strip of the fiber mat had about 450 V surface charge before testing, and did not exhibit any charge decay.

EXAMPLE 26

Free Standing polymer Film Containing Vanadium Oxide

Deionized water (138.8 g) and Polymer B (46.2 g of a 26% dispersion) were added to 15.0 grams of vanadium oxide dispersion containing 1.12% vanadium (prepared as described in Section II above) to give a solution with a weight ratio vanadium:polymer of 2:143. The solution was spin cast at 500 rpm in a polytetrafluoroethylene (Teflon™) lined drum under a purge of nitrogen. The resulting 0.2 millimeter thick film was peeled away from the liner. The film was clear, dark brown in color, and flexible. The film had a static decay time of 0.01 seconds.

EXAMPLE 27

Article Containing Removable Pressure Sensitive Transfer Adhesive Tape

Deionized water (138.8 g) and Polymer B (46.2 g of a 26% dispersion) were added to 15.0 grams of vanadium oxide dispersion containing 1.12% vanadium (prepared as described in Section II above) to give a solution with a weight ratio vanadium:polymer of 2:143.

The dispersion was coated onto PVDC primed polyester (100 micrometer thick, 0.004 inches) using a #14 Mayer Bar. The coating was dried at 80° C. for 2 minutes. A pressure sensitive (psa) transfer adhesive construction (3M product designation #467 mp) was applied to the coated side of the PVDC primed polyester. The release liner was removed and the coated construction (psa tape) having a layer of psa overlying the antistatic layer of the invention was tested for static decay. The static decay time was measured at 0.06 seconds. A sample containing no vanadium oxide exhibited no static decay.

In another embodiment a psa tape can be provided having a layer of psa on a surface of the substrate opposite to that having the antistatic layer. Either of these tape embodiments, which can further comprise a layer of a low adhesion backsize directly over the psa or on the back side of the substrate, can be rolled up to provide a roll of psa tape.

Comparative Example 1

Determination of $[V]_{eff}$ in a Polymer A Coating of Constant Coating Weight for Coatings Containing $NaVO_3$ Polymer A (2.86 g of a 21% dispersion), deionized water (6.15 g) and Triton X-100 surfactant (0.05 g of a 10% solution) were added to 1.0 g of 4.0% $NaVO_3$ solution to give a slightly hazy, water white solution containing 0.17% vanadium and 6.0% polymer with weight ratio vanadium:polymer=2:72. The solution was coated onto PVDC primed polyester by hand draw down using a No. 3 Mayer bar and dried at 100° C. for 5 minutes to give a slightly hazy coating with a calculated vanadium surface concentration=11.6 mg/m². The coated film did not exhibit static decay. The procedure was repeated using greater amounts of $NaVO_3$ solution as shown in Table XVII. The calculated vanadium surface concentration and the static decay times of films coated using a No. 3 Mayer bar are tabulated in Table XVII.

TABLE XVII

| vanadium concentration | 0.17% | 0.33% | 0.67% |
|---|---|---|---|
| 4.0% NaVO$_3$ solution | 1.00 g | 2.00 g | 4.00 g |
| deionized water | 6.15 g | 5.14 g | 3.14 g |
| 21.0% polymer solution | 2.86 g | 2.86 g | 2.86 g |
| 10.0% Triton X-100 | 0.05 g | 0.05 g | 0.05 g |
| vanadium surface concentration, [V], mg/m$^2$ | 11.5 | 22.9 | 45.9 |
| static decay time, sec | ** | ** | 120 |
| film appearance | sl. hazy | hazy | hazy |

**did not exhibit static decay

The data of Table XVII show that NaVO$_3$ solution and sulfopolymer formulations provide a coating with poor static decay properties.

Comparative Example 2

Sodium Metavanadate Plus Sulfopolyester Polymer A Dispersion

The procedure of Example 3 was repeated except that 0.75 g of 1.0% vanadium oxide sol was replaced with 0.75 g of 1.33% NaVO$_3$ solution in each of the compositions tabulated in Table III. Coating and drying of films with the coating solutions was repeated as described in Example 3. None of the coated films exhibited static decay.

Comparative Example 3

The compatibility of vanadium oxide colloidal dispersion with polyacrylic acid was investigated. Vanadium oxide colloidal dispersion, prepared as described in Section II, was diluted with deionized water to form a colloidal dispersion containing 0.28% vanadium (0.5% vanadium oxide). When 1.5 grams of the diluted colloidal dispersion was added to approximately 7.0 grams of 1.0% polyacrylic acid (MW= 5000, product of Polysciences, Inc., Warrington, Pa.), dark greenish brown clots separated from the solution. When the polyacrylic acid dispersion was added to the vanadium oxide dispersion, a similar flocculation occurred. This did not provide a usable coating solution.

Various modifications and alterations of this invention will become apparent to those skilled in the art without departing from the scope and spirit of this invention, and it should be understood that this invention is not to be unduly limited to the illustrative embodiments set forth herein.

We claim:

1. An aqueous mixture comprising colloidal vanadium oxide and a dispersed sulfonated polymer comprising at least one unit containing a salt of a —SO$_3$H group in an amount more than zero and up to 15 percent by weight solids based on the sulfonated polymer and vanadium oxide composition, said vanadium oxide being present in the range of 0.2 to 50 weight percent on a dry basis of total solids, the aqueous mixture being present in an amount sufficient to provide said article with antistatic properties.

2. The mixture according to claim 1 comprising in the range of 0.2 to 50 weight percent vanadium oxide and 50 to 99.8 weight percent sulfonated polymer, based on total solids.

3. The mixture according to claim 2 wherein the weight percent vanadium oxide is in the range of 0.2 to 20 and the weight percent sulfonated polymer is in the range of 80 to 99.8 based on total solids.

4. The mixture according to claim 2 wherein the weight percent vanadium oxide is in the range 0.5 to 10 and the weight percent sulfonated polymer is in the range 90 to 99.5 based on total solids.

5. The mixture according to claim 1 wherein said vanadium oxide comprises at least one of vanadium(+4) and vanadium(+5) oxidation states.

6. The mixture according to claim 1 wherein said sulfonated polymer is a sulfopolyester.

7. The mixture according to claim 1 wherein said sulfonated polymer is a sulfopolyurethane.

8. The mixture according to claim 1 wherein said sulfonated polymer is a sulfopolyurethane-urea.

9. The mixture according to claim 1 wherein said sulfonated polymer is an ethylenically-unsaturated sulfopolymer.

10. The mixture according to claim 1 wherein said sulfonated polymer is a sulfopolyester polyol.

11. The mixture according to claim 1 wherein said sulfonated polymer is a sulfopolyol.

12. The mixture according to claim 1 which has been dried.

13. The mixture according to claim 1 which is homogeneous.

14. The aqueous mixture according to claim 1 which comprises at least one water-miscible organic solvent.

* * * * *

UNITED STATES PATENT AND TRADEMARK OFFICE
CERTIFICATE OF CORRECTION

PATENT NO.   :   5,468,498
DATED        :   November 21, 1995
INVENTOR(S)  :   Eric D. Morrison et al.

It is certified that error appears in the above-indentified patent and that said Letters Patent is hereby corrected as shown below:

Col. 2, line 55, "07,893,504" should be -- 07/893,504 --.

Col. 9, line 9, "H-(OR$^5$)d-OH" should read -- H-(OR$^5$)$_d$-OH --.

Col. 20, line 25, "22 moles" should be -- .22 moles --.

Col. 28, line 42, "V2O$_5$" should be -- V$_2$O$_5$ --.

Signed and Sealed this

Twenty-fifth Day of June, 1996

Attest:

BRUCE LEHMAN

*Attesting Officer*     *Commissioner of Patents and Trademarks*